(12) United States Patent
Topliss et al.

(10) Patent No.: US 12,523,866 B1
(45) Date of Patent: Jan. 13, 2026

(54) PIEZOELECTRIC ACTUATOR FOR DEFORMABLE LENS

(71) Applicant: Apple Inc., Cupertino, CA (US)

(72) Inventors: Richard J. Topliss, Cambridge (GB); James E. Pedder, Thame (GB)

(73) Assignee: Apple Inc., Cupertino, CA (US)

( * ) Notice: Subject to any disclaimer, the term of this patent is extended or adjusted under 35 U.S.C. 154(b) by 1128 days.

(21) Appl. No.: 17/343,261

(22) Filed: Jun. 9, 2021

Related U.S. Application Data

(60) Provisional application No. 63/036,883, filed on Jun. 9, 2020.

(51) Int. Cl.
*G02B 26/08* (2006.01)
*H02N 2/10* (2006.01)
*H02N 2/14* (2006.01)

(52) U.S. Cl.
CPC ......... *G02B 26/0875* (2013.01); *H02N 2/103* (2013.01); *H02N 2/145* (2013.01)

(58) Field of Classification Search
CPC . G02B 3/12; G02B 3/14; G02B 7/023; G02B 7/04; G02B 26/004; G02B 26/0858
See application file for complete search history.

(56) References Cited

U.S. PATENT DOCUMENTS

| 7,986,466 | B2 | 7/2011 | Lee |
| 2001/0017985 | A1 | 8/2001 | Tsuboi |
| 2006/0041307 | A1 | 2/2006 | Esch |
| 2006/0262431 | A1* | 11/2006 | Ohsato ................... G02B 7/102 359/824 |
| 2009/0128922 | A1 | 5/2009 | Justis |
| 2010/0039709 | A1 | 2/2010 | Lo |
| 2010/0202054 | A1 | 8/2010 | Niederer |
| 2021/0325575 | A1 | 10/2021 | Niederer |

FOREIGN PATENT DOCUMENTS

CN 101632030 1/2012

OTHER PUBLICATIONS

U.S. Appl. No. 17/343,602, filed Jun. 9, 2021, Richard J. Topliss, et al.

* cited by examiner

*Primary Examiner* — Joseph P Martinez
(74) *Attorney, Agent, or Firm* — Robert C. Kowert; Kowert, Hood, Munyon, Rankin & Goetzel, P.C.

(57) ABSTRACT

Various embodiments include a piezoelectric actuator for driving motion of a deformable lens. The piezoelectric actuator may include a frame coupled with piezoelectric elements. According to some embodiments, the piezoelectric elements may be activated to produce relative elliptical motion between portions of the frame. The relative elliptical motion may modulate friction between surfaces of the frame, so as to drive motion of at least a portion of the deformable lens.

20 Claims, 22 Drawing Sheets

Direction of Lens Travel

PIEZOELECTRIC ACTUATOR FOR DEFORMABLE LENS

BACKGROUND

This application claims benefit of priority to U.S. Provisional Application Ser. No. 63/036,883, entitled "Piezoelectric Actuator for Deformable Lens," filed Jun. 9, 2020, and which is incorporated herein by reference in its entirety.

TECHNICAL FIELD

This disclosure relates generally to a piezoelectric actuator for driving motion of a deformable lens.

DESCRIPTION OF THE RELATED ART

Optics systems may be used in various types of devices and applications. A camera in a mobile multifunction device, for example, may include an optics system and an image sensor. An optics system may include one or more optical elements, such as a lens. Some optics systems may include a deformable membrane that functions as a lens. In some systems, an actuator may be used to change the shape of the deformable membrane to vary the optical power and/or other optical characteristics of the lens.

BRIEF DESCRIPTION OF THE DRAWINGS

FIG. 1A shows a cross-sectional view of the optics system. FIG. 1B shows a side view of the optics system and illustrates an example of deformation of the deformable lens.

FIG. 2A shows a perspective view of an example optics system that may include a piezoelectric actuator arrangement. FIG. 2B shows a top view of the piezoelectric actuator. FIG. 2C shows a side view of the piezoelectric actuator. FIG. 2D shows a portion of an example portion of a frame (also referred to herein as a "frame portion" of the piezoelectric actuator) coupled with piezoelectric elements. FIG. 2E shows, via a series of example states of the frame portion at different points in time, an example of motion that may advance the frame portion (and the deformable lens) in a first direction (e.g., upwards, parallel to an optical axis) based at least in part on activation of at least one of the piezoelectric elements. FIG. 2F shows, via a series of example states of the frame portion at different points in time, an example of motion that may advance the frame portion (and the deformable lens) in a second direction (e.g., downwards, parallel to the optical axis) based at least in part on activation of at least one of the piezoelectric elements.

FIG. 3A shows a perspective view of a portion of an example optics system that may include a piezoelectric actuator arrangement. FIG. 3B shows a perspective view of the piezoelectric actuator. FIG. 3C shows, via a series of example states of the piezoelectric actuator at different points in time, an example of motion that may advance a frame portion of the piezoelectric actuator (and the deformable lens) in a first direction (e.g., upwards along an optical axis) based at least in part on activation of piezoelectric elements. FIG. 3D shows, via a series of example states of the piezoelectric actuator at different points in time, an example of motion that may advance the frame portion (and the deformable lens) in a second direction (e.g., downwards along the optical axis) based at least in part on activation of the piezoelectric elements.

FIG. 4A shows a perspective view of a portion of an example optics system that may include a piezoelectric actuator arrangement. FIG. 4B shows a perspective view of the piezoelectric actuator. FIG. 4C shows, via a series of example states of the piezoelectric actuator at different points in time, an example of motion that may advance a frame portion of the piezoelectric actuator (and the deformable lens) in a first direction (e.g., upwards, parallel to an optical axis) based at least in part on activation of piezoelectric elements. FIG. 4D shows, via a series of example states of the piezoelectric actuator at different points in time, an example of motion that may advance the frame portion (and the deformable lens) in a second direction (e.g., downwards, parallel to the optical axis) based at least in part on activation of the piezoelectric elements.

FIG. 5A shows a perspective view of a portion of an example optics system that may include a piezoelectric actuator arrangement. FIG. 5B shows a perspective view of the piezoelectric actuator. FIG. 5C shows, via a series of example states of the piezoelectric actuator at different points in time, an example of motion that may advance a frame portion of the piezoelectric actuator (and the deformable lens) in a first direction (e.g., upwards, parallel to an optical axis) based at least in part on activation of piezoelectric elements. FIG. 5D shows, via a series of example states of the piezoelectric actuator at different points in time, an example of motion that may advance the frame portion (and the deformable lens) in a second direction (e.g., downwards, parallel to the optical axis) based at least in part on activation of the piezoelectric elements.

Figure 1A:
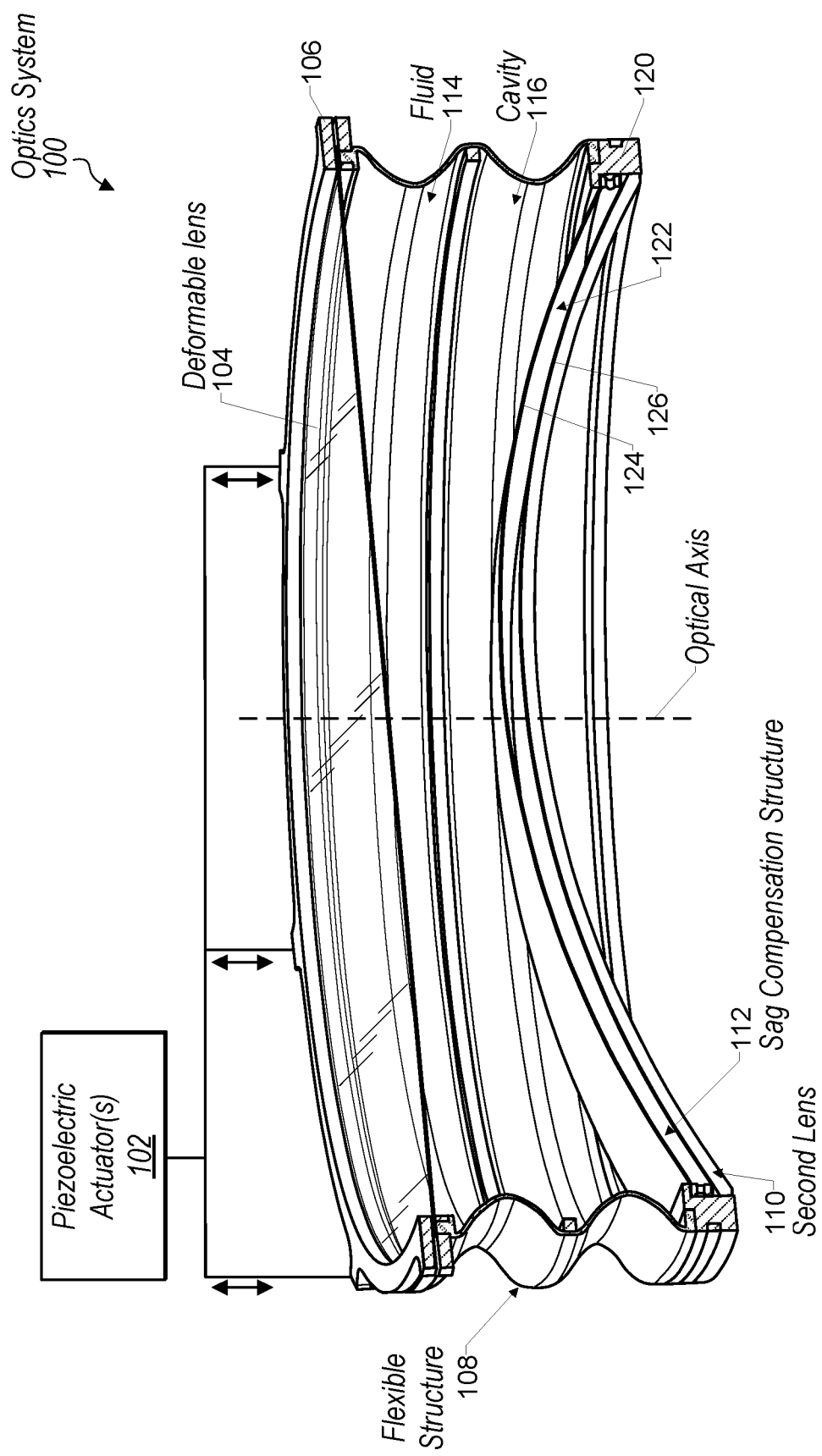
FIGS. 1A-1B illustrate aspects of an example optics system that may include one or more piezoelectric actuators and a deformable lens, in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112 (f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to a piezoelectric actuator for driving motion of a deformable lens. The piezoelectric actuator may include a frame coupled with piezoelectric elements. According to some embodiments, the piezoelectric elements may be activated to produce relative elliptical motion between portions of the frame. The relative elliptical motion may modulate friction between surfaces of the frame, so as to drive motion of at least a portion of the deformable lens.

In some embodiments, an optics system may include a deformable lens and one or more piezoelectric actuators arranged around the deformable lens at respective actuation points. The piezoelectric actuator(s) at such actuation points may be individually controllable, e.g., such that movement of one actuation point may be different (e.g., in timing, direction, etc.) than movement of another actuation point, which may deform the deformable lens into various shapes. In some embodiments, the piezoelectric actuator(s) may be controlled so as to vary the optical power of the deformable lens. Additionally, or alternatively, the piezoelectric actuator(s) may be controlled so as to vary a cylindrical component of the deformable lens (e.g., so that the deformable lens has different optical powers along different axes). In some embodiments, the optics system may be configured to be disposed in front of a user's eye(s) such that light passes through the deformable lens and/or one or more other optical elements of the optics system before the light reaches the user's eye(s). In this manner, the optics system may be used for correcting user eye prescription in some embodiments. As a non-limiting example, varying the optical power of the deformable lens as discussed herein may enable the optics system to correct for myopia in some embodiments. As another non-limiting example, varying a cylindrical component of the deformable lens as discussed herein may enable the optics system to correct for astigmatism in some embodiments.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

Figure 1B:
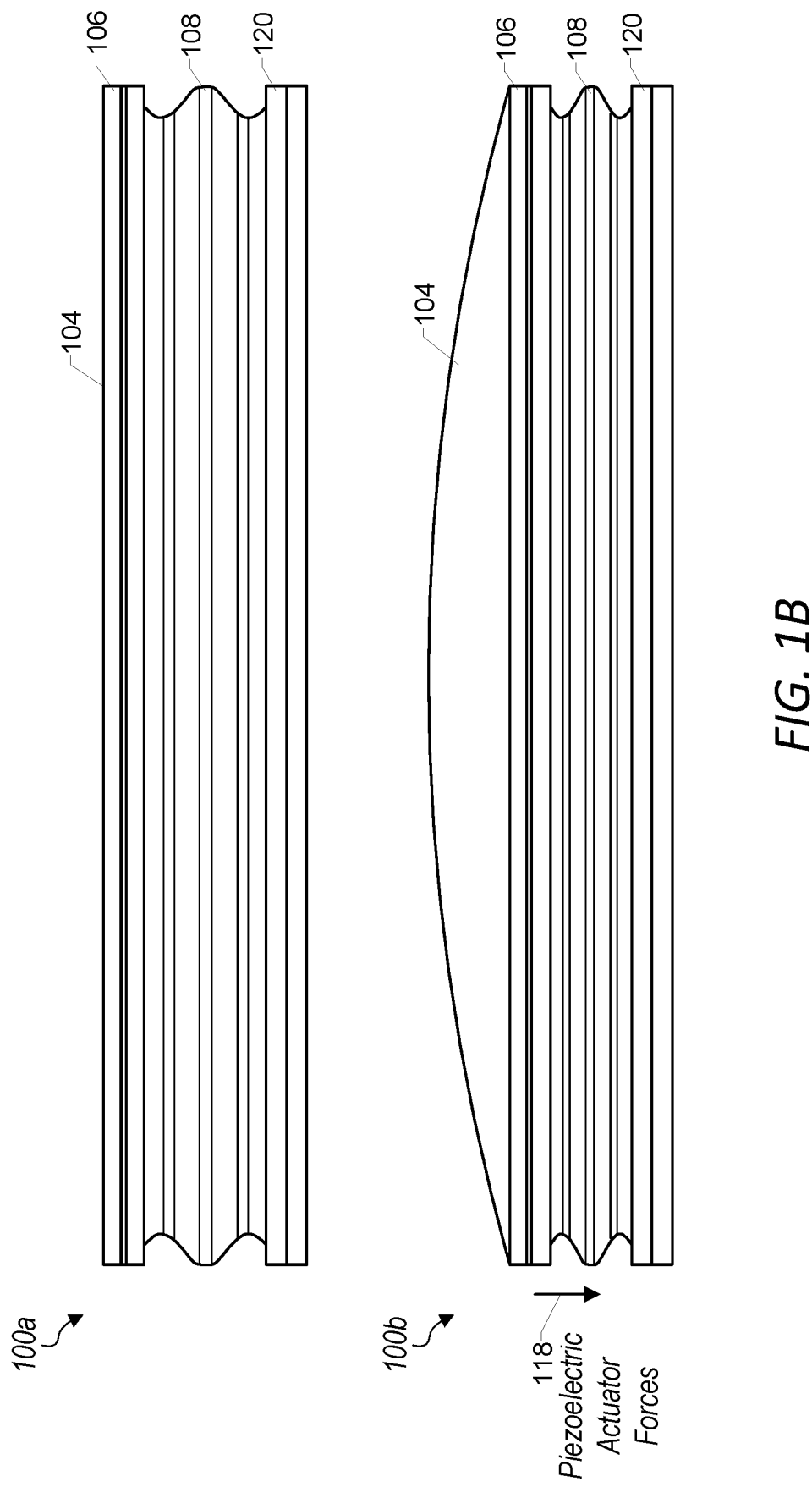

As mentioned above, various embodiments include a piezoelectric actuator for driving motion of a deformable lens. FIGS. 1A-1B illustrate aspects of an example optics system 100 that may include one or more of such piezoelectric actuators 102. FIG. 1A shows a cross-sectional view of the optics system 100. FIG. 1B shows a side view of the optics system 100 and illustrates an example of deformation of the deformable lens 104. According to various embodiments, a piezoelectric actuator 102 may include piezoelectric elements and a frame coupled with the piezoelectric elements, e.g., as discussed herein with reference to at least FIGS. 2A-5D, which show some non-limiting embodiments of piezoelectric actuators that may be included in the optics system 100.

In various embodiments, the piezoelectric actuator(s) 102 may be coupled with the deformable lens 104. In some examples, the optics system 100 may include a coupling structure 106 that extends around at least a portion of a periphery of the deformable lens 102. In some embodiments, the coupling structure 106 may be annular-shaped and/or may encircle the deformable lens 102, e.g., as indicated in FIG. 1A. The coupling structure 106 may be attached to the deformable lens 104. Furthermore, the coupling structure 106 may be coupled with the piezoelectric actuator(s) 102, such that the piezoelectric actuator(s) 102 are coupled with the deformable lens 104 via the coupling structure 106. In some embodiments, the coupling structure 106 may couple the deformable lens 104 with one or more other components/structures of the optics system 100. As a non-limiting example, the coupling structure 106 may couple the deformable lens 104 with a flexible structure 108 (e.g., comprising one or more bellows) of the optics system 100, e.g., as indicated in FIG. 1A. The flexible structure 108 may be configured to couple the deformable lens 104 with one or more other components, e.g., another lens 110 and/or a sag compensation structure 112, as discussed in further detail below. Additionally, or alternatively, the flexible structure 108 may be flexible or otherwise configured to allow the motion of the deformable lens, as driven by the piezoelectric actuator(s) 102, relative to one or more other portions of the optics system 100.

In various embodiments, the piezoelectric actuator(s) 102 may be attached to one or more portions of the coupling structure 106, such that the piezoelectric actuator(s) 102 are coupled to, and capable of influencing movement and/or positioning of, the deformable lens 104. In some embodiments, the piezoelectric actuator(s) 102 may be attached to multiple portions of the coupling structure 106 and may be controllable (e.g., via control signals from a controller of the optics system 100 and/or a controller of a device comprising the optics system 100) to cause the respective portions of the coupling structure 106 to move (and/or flex) in at least a direction parallel to the optical axis, e.g., to vary the optical power and/or otherwise vary one or more optical characteristics of the deformable lens 104 and/or the optics system 100.

In some embodiments, the optics system 100 may comprise one or more fluids contained within one or more cavities. For example, a fluid 114 may be contained within a cavity 116 that is at least partially defined by the deformable lens 104, e.g., as indicated in FIG. 1A. Motion driven via the piezoelectric actuator(s) 102 may displace the fluid 114. The displacement of the fluid 114 may cause the deformable lens 104 to deform, which may in turn alter one or more optical characteristics of the deformable lens 104 and/or the optics system 100. FIG. 1B shows a non-limiting example of a manner in which the deformable lens 104 may deform based at least in part on the piezoelectric actuator(s) 102 and the fluid 114. The FIG. 1B shows a non-limiting example of deformation of the deformable lens 104 based at least in part on the piezoelectric actuator(s) 102 and the fluid 114. For example, at the top of FIG. 1B, the optics system 100a may represent a first actuation state (e.g., without actuation via the piezoelectric actuator(s) 102) in which the deformable lens 104 may be flat. At the bottom of FIG. 1B, the optics system 100b may represent a second actuation state (e.g., with actuation via the piezoelectric actuator(s) 102) in which the deformable lens 104 may be deformed to a dome shape. In some examples, the piezoelectric actuator(s) 102 may produce forces in the direction indicated by arrow 118 in FIG. 1B. The piezoelectric forces may move the deformable lens 104 towards the second lens 110, which may cause the fluid 114 to be displaced. The displacement of the fluid 114 may cause a change in forces that the fluid 114 previously imposed on the deformable lens 104, and the change in such forces may alter the shape of the deformable lens 104. For example, at least a portion of the displaced fluid 114 may push against the deformable lens 104 to produce the dome shape of the deformable lens 104 of the optics system 100b in the second actuation state.

In some embodiments, the piezoelectric actuator(s) 102 may be arranged around the deformable lens 104 at respective actuation points (e.g., respective portions of the coupling structure 106 to which the actuator(s) are attached). The piezoelectric actuator(s) 102 at such actuation points may be individually controllable, e.g., such that movement of one actuation point may be different (e.g., in timing, direction, etc.) than movement of another actuation point, which may deform the deformable lens 104 into various shapes. In some embodiments, the piezoelectric actuator(s) 102 may be controlled so as to vary the optical power of the deformable lens 104, e.g., by controlling the piezoelectric actuator(s) to move the actuation points in the same manner (e.g., same drive direction) at substantially the same time. Additionally, or alternatively, the piezoelectric actuator(s) 102 may be controlled so as to vary a cylindrical component of the deformable lens 104 (e.g., so that the deformable lens 104 has different optical powers along different axes). In some embodiments, the optics system 100 may be configured to be disposed in front of a user's eye(s) such that light passes through the deformable lens 104 and/or one or more other optical elements of the optics system 100 before the light reaches the user's eye(s). In this manner, the optics system 100 may be used for correcting user eye prescription in some embodiments. As a non-limiting example, varying the optical power of the deformable lens 104 as discussed herein may enable the optics system 100 to correct for myopia in some embodiments. As another non-limiting example, varying a cylindrical component of the deformable lens 104 as discussed herein may enable the optics system 100 to correct for astigmatism in some embodiments.

In various embodiments, the sag compensation structure 112 and/or the second lens 110 may be coupled to the flexible structure 108 via one or more coupling structures 120. In some embodiments, the sag compensation structure 112 may include one or more sag compensation membranes. The sag compensation membrane(s) may deformably interface with fluids, such as the fluid 114 ("first fluid") and a second fluid 122. The term "deformably interface" may be used herein to refer to a membrane interfacing with one or more components (e.g., including, but not limited to, one or more fluids) that may cause deformation of the membrane. In some non-limiting embodiments, the first sag compensation membrane 124 may directly interface with the first fluid and the second fluid, e.g., via direct contact between the first sag compensation membrane 124 and each of the first fluid 114 and the second fluid 122. In some non-limiting embodiments, the second sag compensation membrane 126 may directly interface with the second fluid 122, e.g., via direct contact between the second sag compensation membrane 126 and the second fluid 122. In other embodiments, the sag compensation structure 112 may include a sag compensation membrane, with the second fluid 122 contained between the sag compensation membrane and the second lens 110, and the sag compensation membrane may directly interface with the first fluid 114 and the second fluid 122.

According to some embodiments, the second lens 110 may comprise a curved lens (e.g., a meniscus lens). Furthermore, a curved surface of the second lens 110 may be placed against the sag compensation structure 112, thereby deforming at least a portion of the sag compensation structure 112. For example, the curved surface of the second lens 110 may abut the sag compensation structure 112 and deform one or more sag compensation membranes of the sag compensation structure 112 (e.g., in a dome-like shape) towards the first lens 104. In various embodiments, the second lens 110 may be a lens having a fixed shape. However, in other embodiments, the second lens 110 may have a variable shape. For example, the second lens 110 may comprise another deformable lens membrane in some embodiments.

Figure 2A:
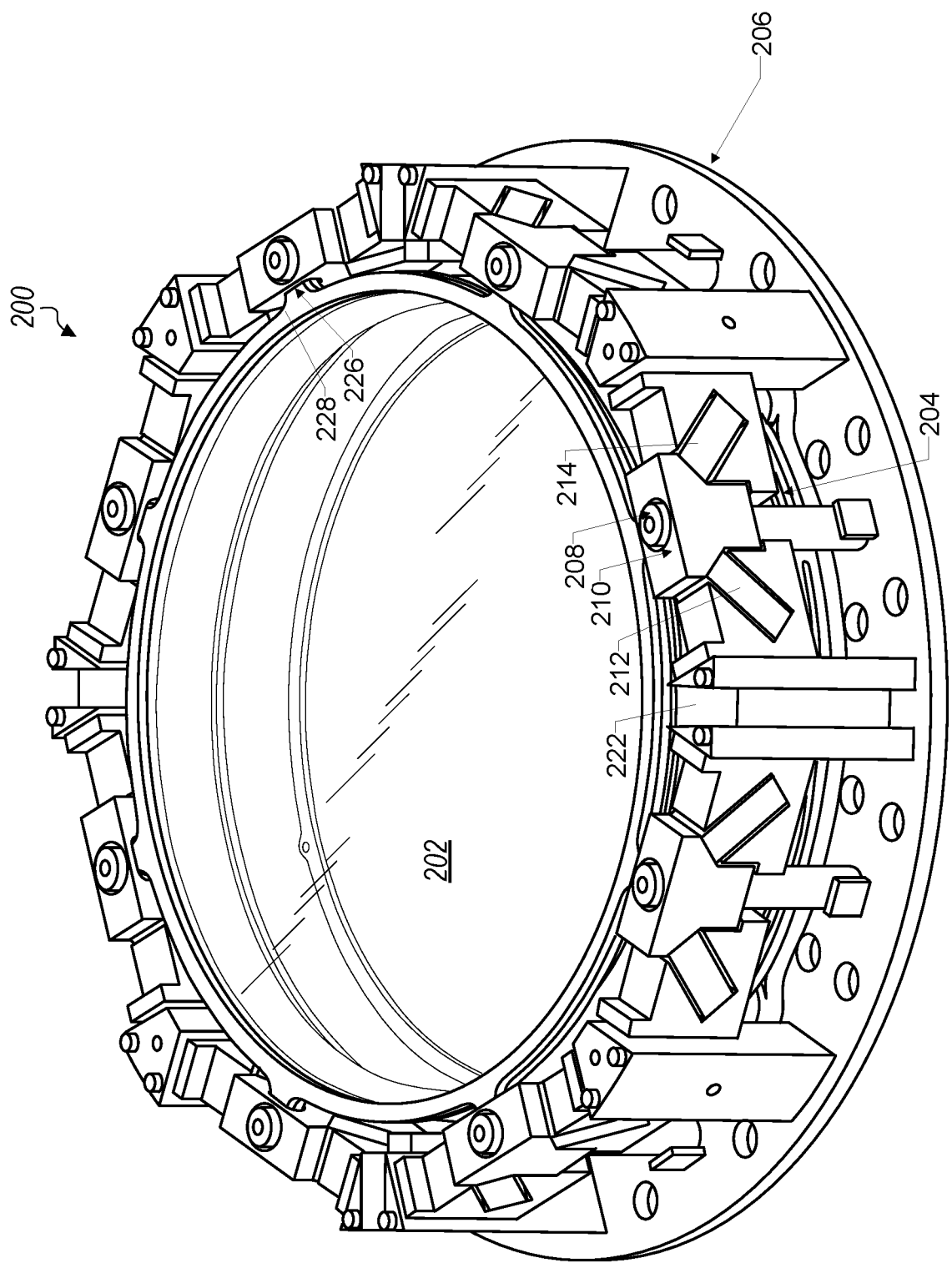
FIGS. 2A-2F illustrate aspects of an example piezoelectric actuator that may be used to drive motion of a deformable lens in an optics system, in accordance with some embodiments.
Figure 2B:
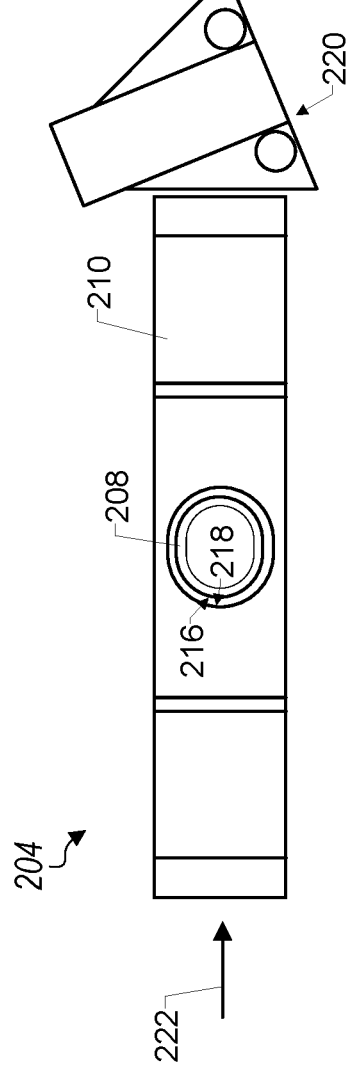
Figure 2C:
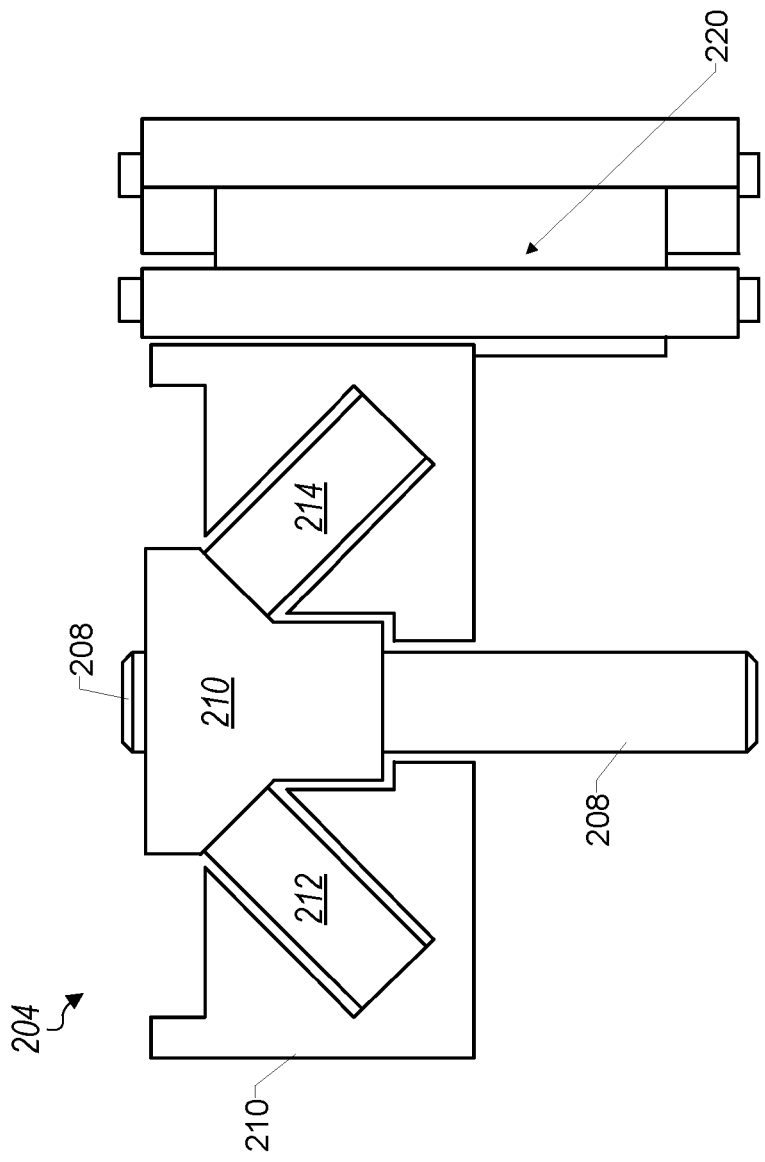
Figure 2D:
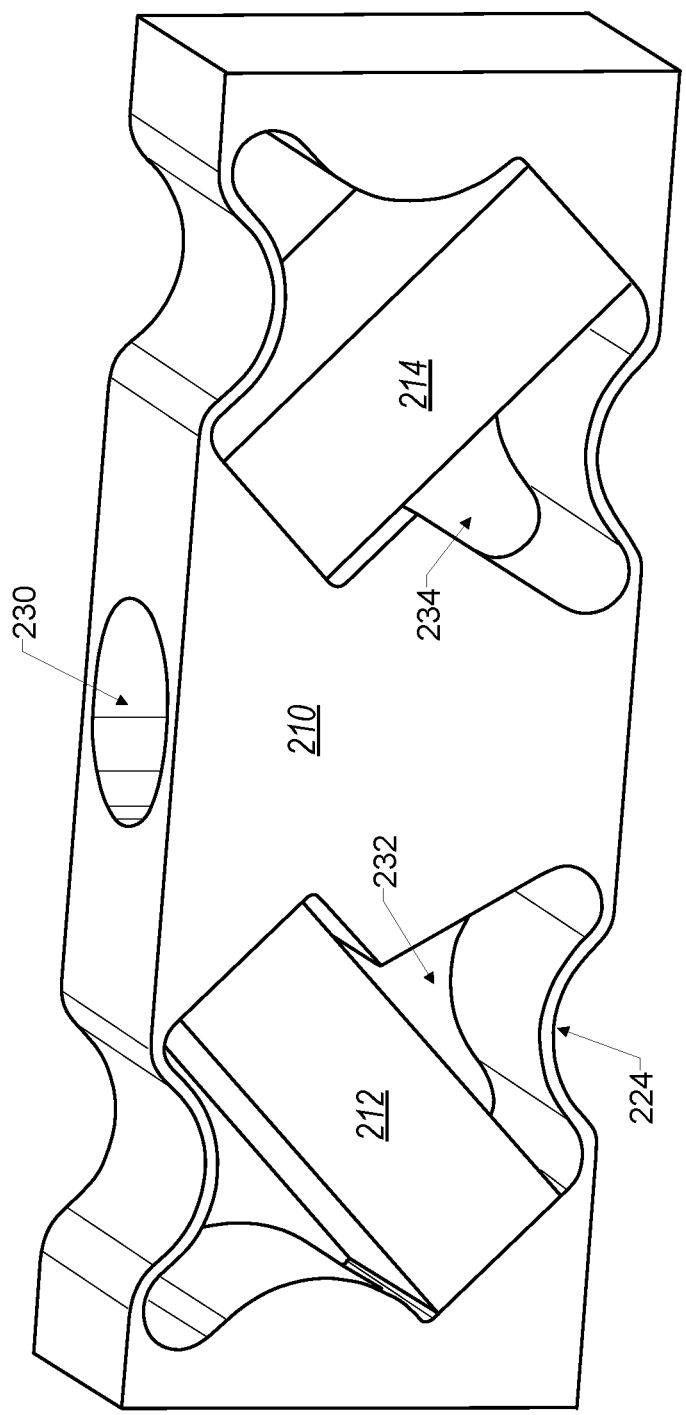
Figure 2E:
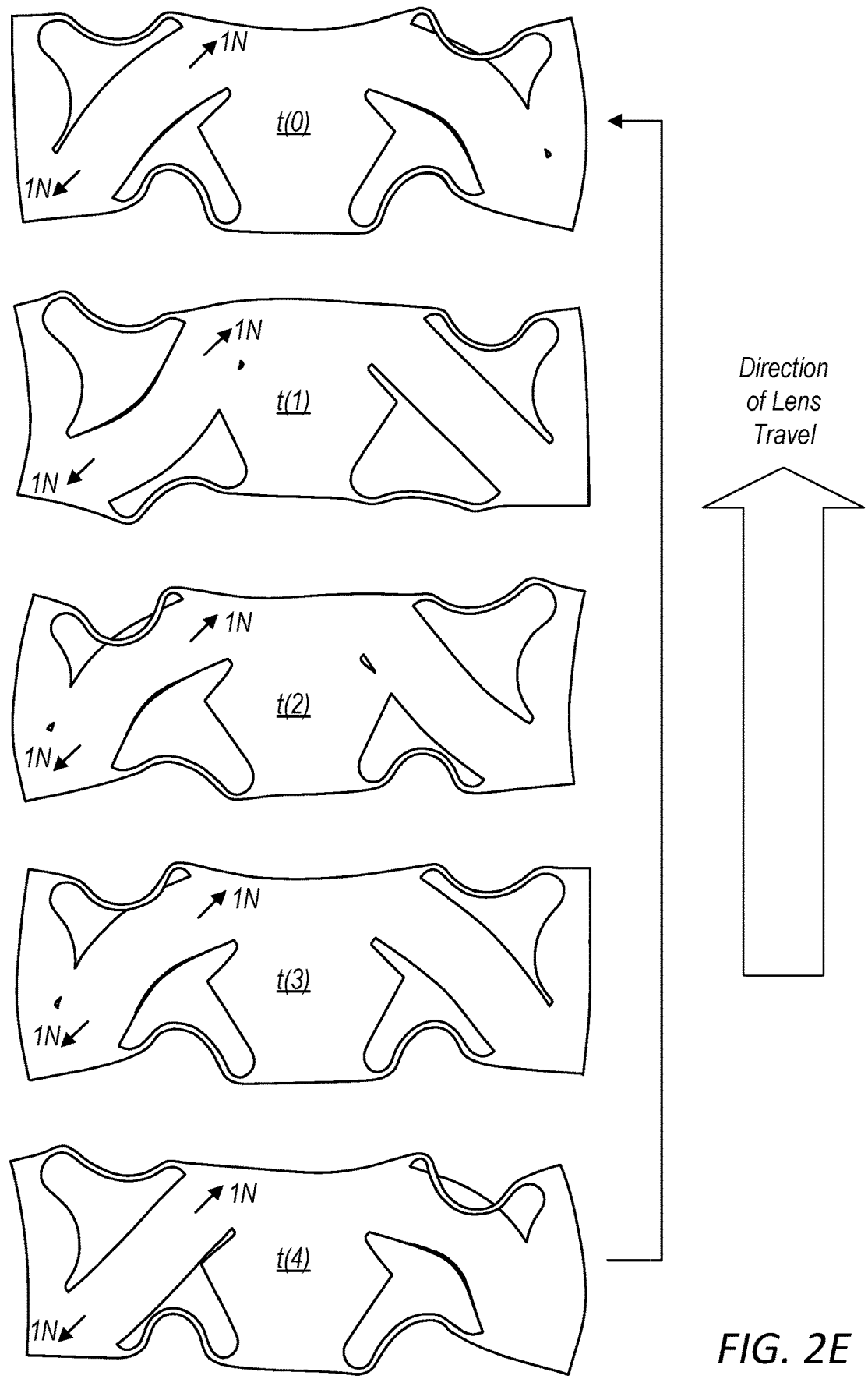
Figure 2F:
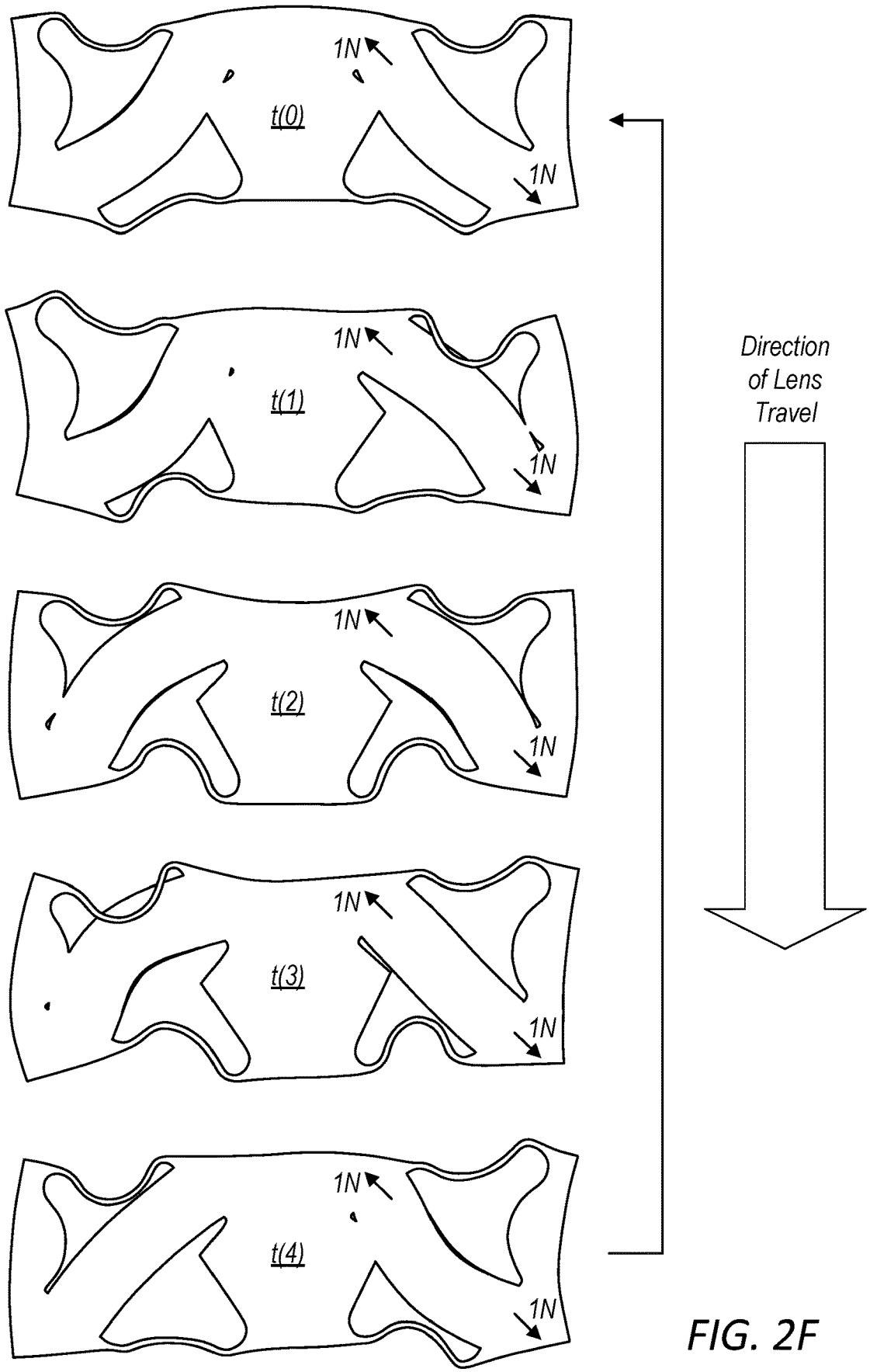

FIGS. 2A-2F illustrate aspects of an example piezoelectric actuator that may be used to drive motion of a deformable lens in an optics system. FIG. 2A shows a perspective view of an example optics system 200 that may include a deformable lens 202 and a piezoelectric actuator arrangement (e.g., comprising one or more piezoelectric actuators 204). FIG. 2B shows a top view of the piezoelectric actuator 204. FIG. 2C shows a side view of the piezoelectric actuator 204. FIG. 2D shows an example portion of a frame (also referred to herein as a "frame portion" of the piezoelectric actuator 204) coupled with piezoelectric elements. FIG. 2E shows, via a series of example states of the frame portion at different points in time, an example of motion that may advance the frame portion (and the deformable lens 202) in a first direction (e.g., upwards, parallel to an optical axis) based at least in part on activation of at least one of the piezoelectric elements. FIG. 2F shows, via a series of example states of the frame portion at different points in time, an example of motion that may advance the frame portion (and the deformable lens 202) in a second direction (e.g., downwards, parallel to the optical axis) based at least in part on activation of at least one of the piezoelectric elements. According to some embodiments, the optics system 200 may be the same as, or similar to, the optics system 100 described herein with reference to FIGS. 1A-1B.

In some embodiments, the optics system 200 may include the deformable lens 202, a piezoelectric actuator arrangement (e.g., comprising the piezoelectric actuators(s) 204), and/or a base structure 206. The deformable lens 202 may define an optical axis (e.g., the optical axis in FIG. 1A). According to some embodiments, the piezoelectric actuator(s) 204 may include multiple piezoelectric actuators 204 arranged at actuation points that circumferentially surround the deformable lens 202, e.g., as indicated in FIG. 2A.

As indicated at least in FIGS. 2A-2C, in some embodiments a piezoelectric actuator 204 may include a frame (e.g., comprising a first frame portion 208 and a second frame portion 210) that is coupled with one or more piezoelectric elements (e.g., first piezoelectric element 212 and second piezoelectric element 214). In some embodiments, each of the first piezoelectric element 212 and the second piezoelectric element 214 may be a respective piezoelectric stack. In some implementations, piezoelectric stacks may enable the optics system 200 to deliver high actuation forces for moving the deformable lens 202 up and down, e.g., relative to the base structure 206 and/or another lens (e.g., second lens 110 in FIG. 1A). The first frame portion 208 may be coupled with the base structure 206. In various embodiments, the base structure 206 may comprise one or more components that are stationary relative to drive motion of the second frame portion 210 and/or the deformable lens 202. According to some embodiments, the first frame portion 208 may include a shaft having a longitudinal dimension that extends in a direction parallel to the optical axis, e.g., as indicated in FIG. 2A. In some embodiments, the second frame portion 210 may be coupled with the first piezoelectric element 212 and the second piezoelectric element 214. The second frame portion 210 may be configured to travel along the shaft (first frame portion 208) to move at least a portion of the deformable lens 202.

In some embodiments, the first frame portion 208 may include one or more rail surfaces 220 (FIG. 2B) for guiding motion in a direction parallel to the optical axis. The second frame portion 210 may include one or more contact surfaces 222. According to various embodiments, the first piezoelectric element 212 and/or the second piezoelectric element 214 can be activated to produce relative elliptical motion between the second frame portion 210 and the first frame portion 208. Such relative elliptical motion may cause the contact surface(s) 222 to engage with (e.g., frictional engagement) the rail surface(s) 220 so as to drive motion of at least a portion of the deformable lens 202, e.g., in an upwards or downwards direction, relative to the base structure 206.

In some embodiments, the optics system 200 and/or the piezoelectric actuator 204 may include a stationary magnet 220, and the second frame portion 210 (and/or one or more components attached to the second frame portion 210) may be configured to magnetically interact with the stationary magnet 220. For example, the second frame portion 210 may be pulled towards the stationary magnet 220, e.g., in a direction 222 orthogonal to the optical axis, via magnetic attraction with the stationary magnet 220. The force in the direction 222 may enable a holding position of the second frame portion 210 (and/or the deformable lens 202) to be maintained, e.g., when the piezoelectric elements 212 and 214 are not actively being used to drive motion of the deformable lens 202. In this manner, reduced power or zero power may be supplied to activate the first piezoelectric element 212 and/or the second piezoelectric element 214 to hold a current position of the deformable lens 202. Such reduced holding power and/or zero holding power may enable a reduction in power consumption by the optics system 200.

As previously mentioned, the first piezoelectric element 212 and/or the second piezoelectric element 214 can be activated to produce relative elliptical motion between the second frame portion 210 and the first frame portion 208. In some embodiments, one of the frame portions may move according to the relative elliptical motion, and another frame portion may be stationary, e.g., as indicated in FIGS. 2A-2E where the second frame portion 210 may have elliptical motion, and the first frame portion 208 may be stationary relative to the second frame portion 210. In other embodiments, e.g., as discussed herein with reference to FIGS. 3A-5D, the frame may comprise multiple moveable frame portions (e.g., first frame portion 306 and second frame portion 308 in FIGS. 3A-3D) that can collectively be characterized as having a relative elliptical motion relationship. The relative elliptical motion may cause the contact surface(s) 222 to engage with (e.g., frictional engagement) the rail surface(s) 220 so as to drive motion of at least a portion of the deformable lens 202, e.g., in an upwards or downwards drive direction, relative to the base structure 206.

In some embodiments, the drive direction may be determined based at least in part on which piezoelectric element(s) is/are activated, a frequency at which a piezoelectric element is operated, and/or a phase difference between portions of the frame of the actuator 204. As indicated in FIG. 2E, to move the deformable lens 202 in an upwards drive direction, the first piezoelectric element 212 may be activated, and the second piezoelectric element 214 may not be activated in some embodiments. In some non-limiting examples, the first piezoelectric element 212 may be operated at a frequency of about 79 kHz. Upon activation, the first piezoelectric element 212 may compress and/or expand, which may cause the second frame portion 210 to flex/deform (e.g., at least partially via one or more flexures 224), e.g., so as to produce elliptical motion of the contact surface 218 in a clockwise direction as indicated by the series of example states at times t(0)-t(4) in FIG. 2E. In some embodiments, the elliptical motion in the clockwise direction may modulate friction between the contact surface 218 of the second frame portion 210 and the rail surface 216 of the first frame portion 208, to produce resultant drive forces that overcome the stationary magnet's 220 magnetic attraction and that advance the second frame portion 210 along the shaft (first frame portion 208) in a first drive direction (e.g., an upwards drive direction). In various embodiments, the second frame portion 210 may be fixedly coupled with the deformable lens 202. For example, the second frame portion 210 may be connected (e.g., at connection(s) 226 in FIG. 2A) to a coupling structure 228 (which may be the same as, or similar to, the coupling structure 106 in FIGS. 1A-1B) that at least partially encircles the deformable lens 202. Furthermore, the coupling structure 228 may be attached to the deformable lens 202. In various embodiments, the drive motion of the second frame portion 210 may cause at least a portion of the deformable lens 202 to move in the same drive direction.

As indicated in FIG. 2F, to move the deformable lens 202 in a downwards drive direction, the second piezoelectric element 214 may be activated, and the first piezoelectric element 212 may not be activated in some embodiments. In some non-limiting examples, the second piezoelectric element 214 may be operated at a frequency of about 79 kHz. Upon activation, the second piezoelectric element 214 may compress and/or expand, which may cause the second frame portion 210 to flex/deform (e.g., at least partially via one or more flexures 224), e.g., so as to produce elliptical motion of the contact surface 218 in a counter-clockwise direction as indicated by the series of example states at times t(0)-t(4) in FIG. 2F. In some embodiments, the elliptical motion in the counter-clockwise direction may modulate friction between the contact surface 218 of the second frame portion 210 and the rail surface 216 of the first frame portion 208, to produce resultant drive forces that overcome the stationary magnet's 220 magnetic attraction and that advance the second frame portion 210 along the shaft (first frame portion 208) in a second drive direction (e.g., a downwards drive direction) that is opposite the first drive direction.

According to some embodiments, the second frame portion 210 may define a hole 230 configured to receive the shaft (first frame portion 208). In some embodiments, the contact surface(s) 222 may at least partially define the hole 230. In some embodiments, the first piezoelectric element 212 may be disposed within a first cavity 232 defined by the second frame portion 210, e.g., to a first side of the hole 230. The second piezoelectric element 214 may be disposed within a second cavity 234 defined by the second frame portion 210, e.g., to a second side of the hole 230 (opposite the first side). The first piezoelectric element 212 may have a first orientation, and the second piezoelectric element 214 may have a second orientation different from the first orientation. For example, the first piezoelectric element 212 may be oriented in a different direction than the second piezoelectric element 212. In some embodiments, each of the first piezoelectric element 212 and the second piezoelectric element 214 may be oriented at a non-zero angle (e.g., 45 degrees) to the shaft (first frame portion 208).

Figure 3A:
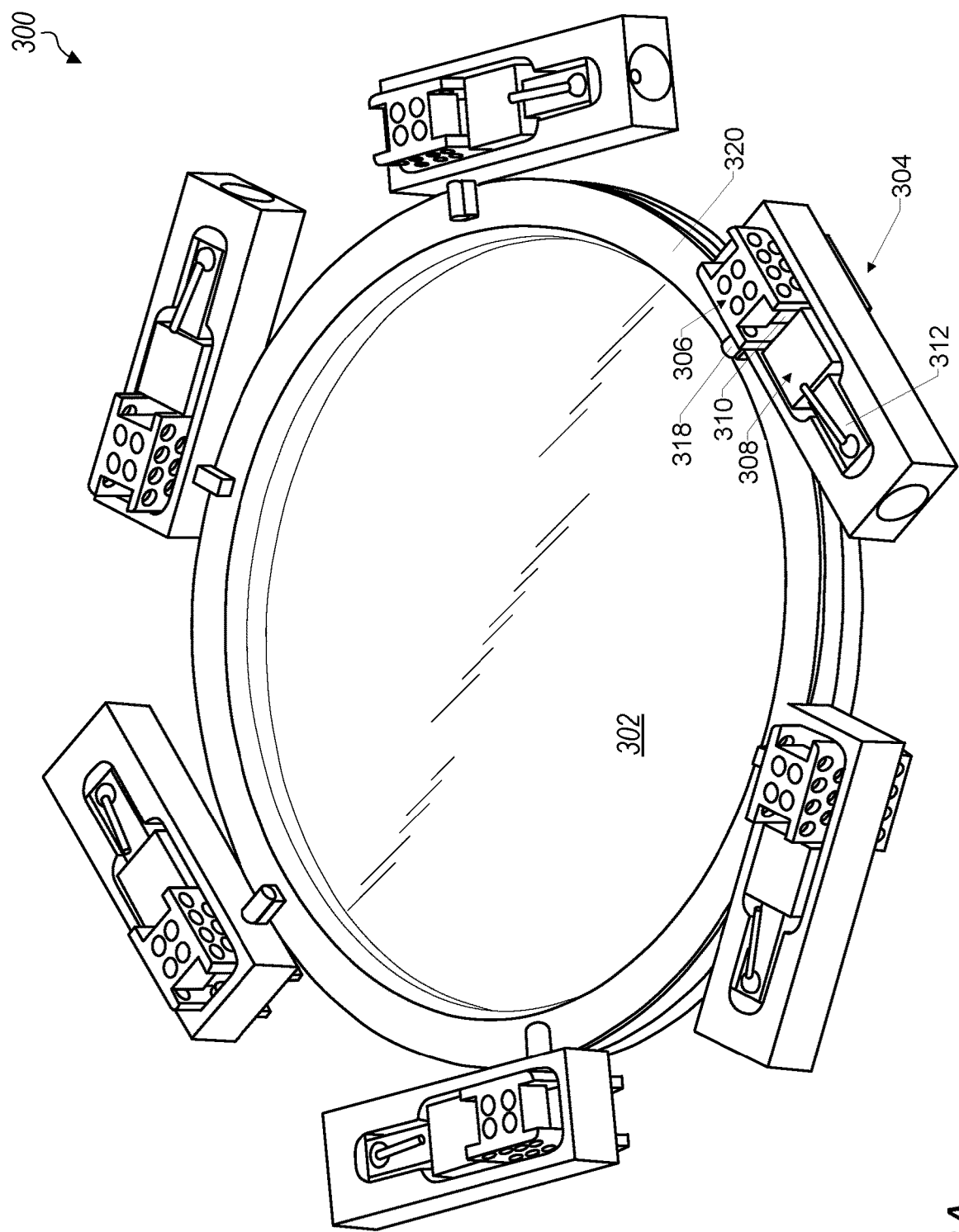
FIGS. 3A-3D illustrate aspects of another example piezoelectric actuator that may be used to drive motion of a deformable lens in an optics system, in accordance with some embodiments.
Figure 3B:
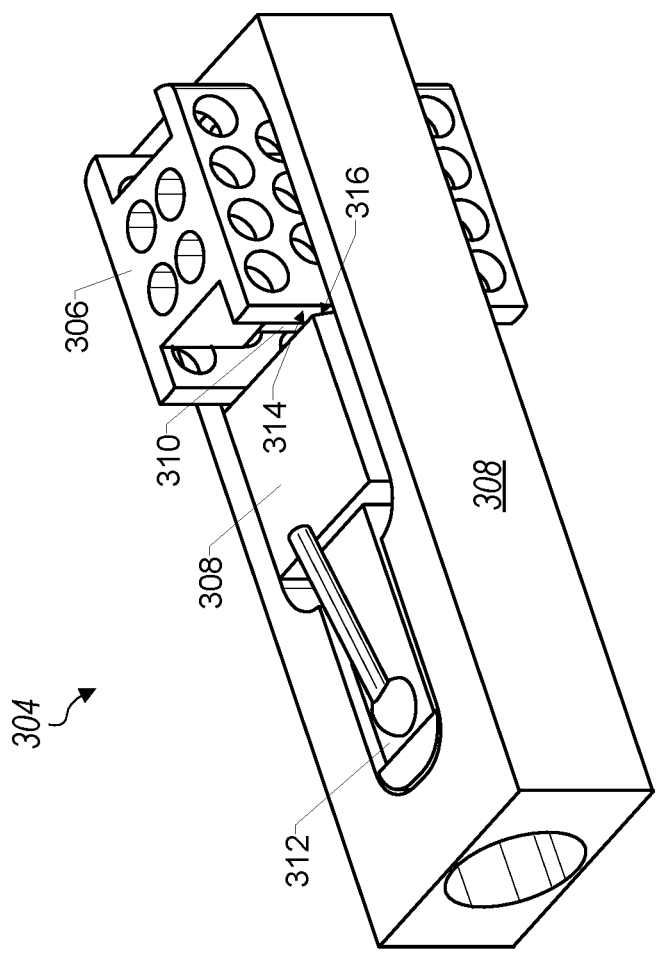
Figure 3C:
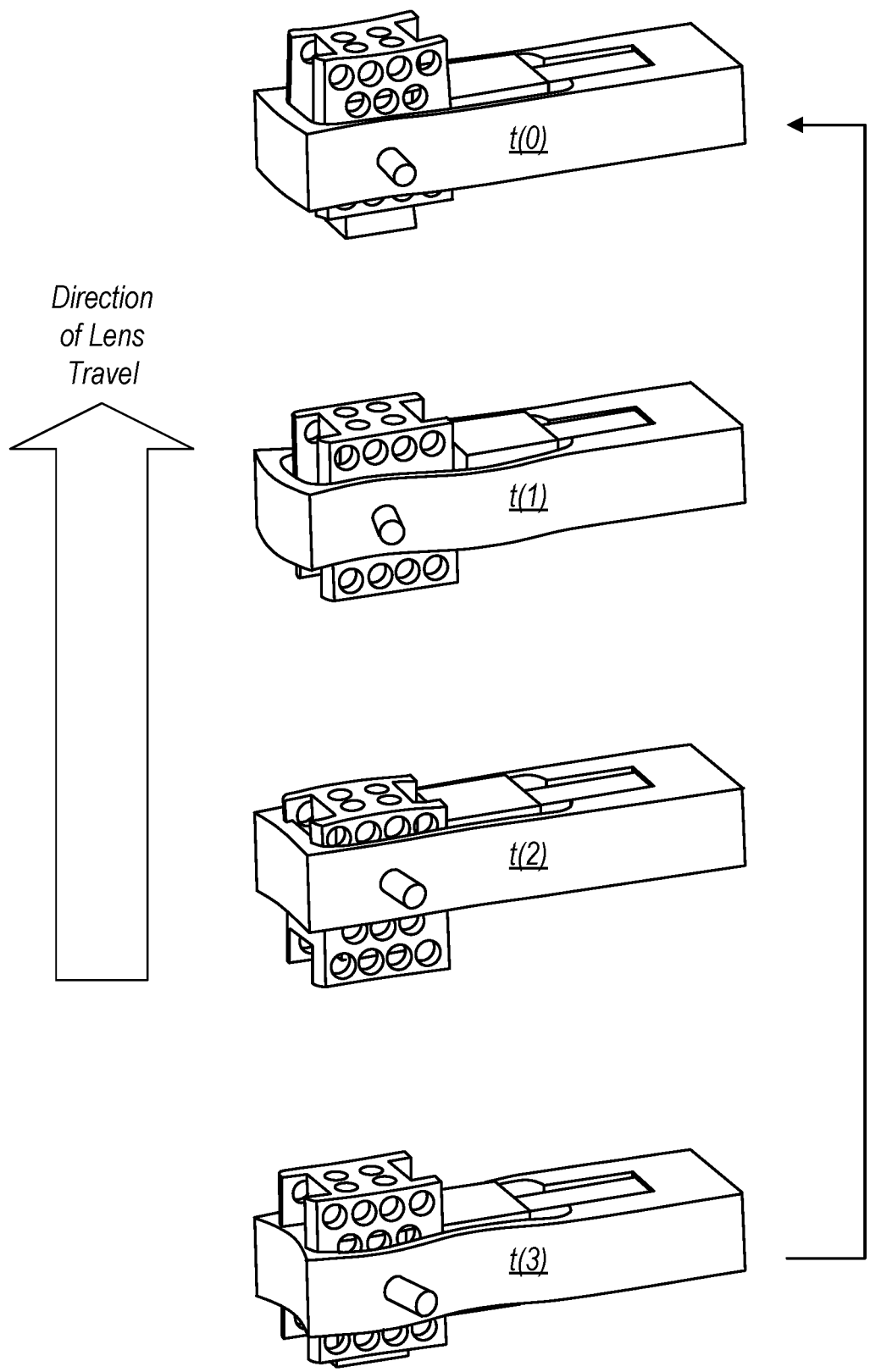
Figure 3D:
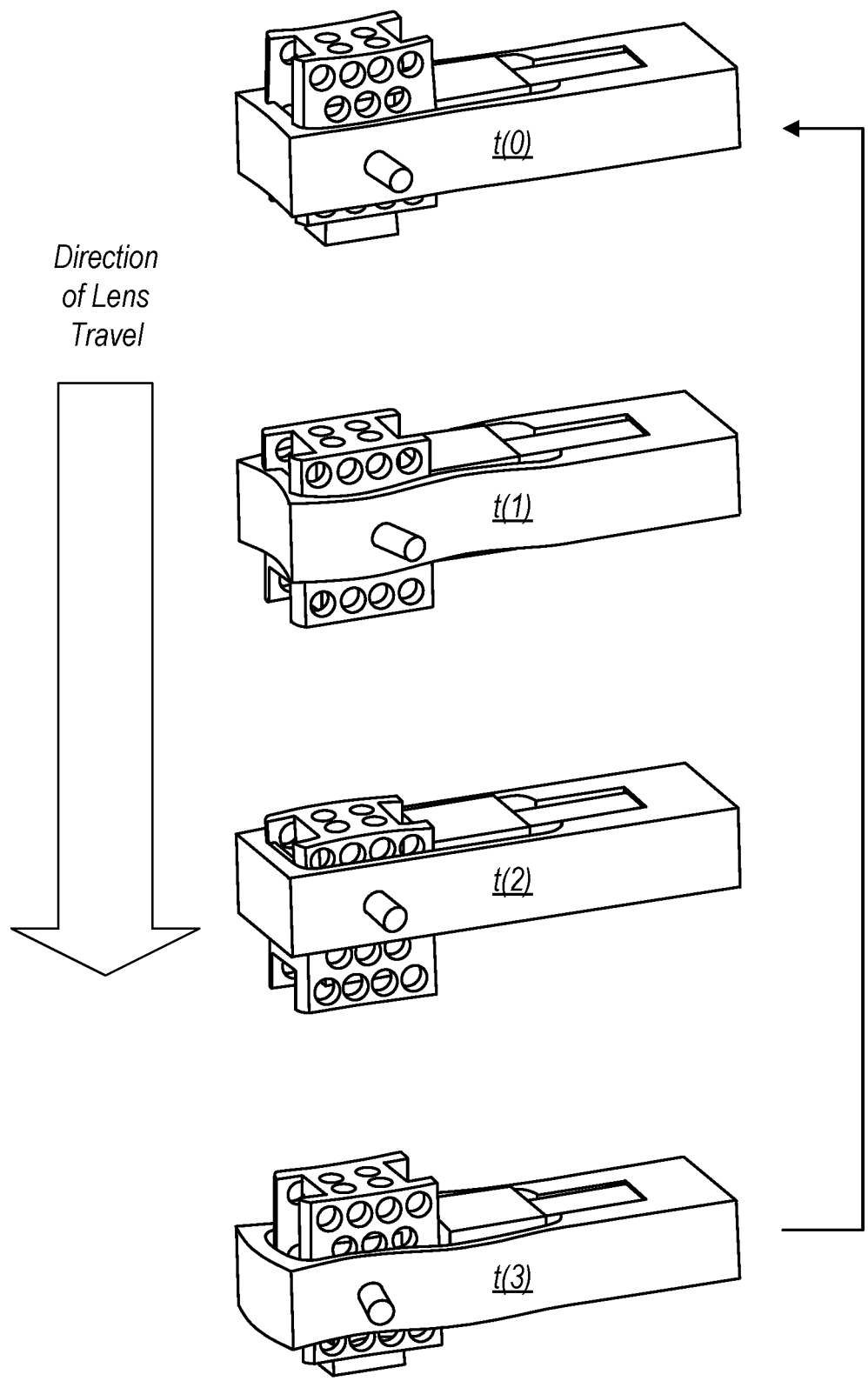

FIGS. 3A-3D illustrate aspects of another example piezoelectric actuator that may be used to drive motion of a deformable lens in an optics system. FIG. 3A shows a perspective view of a portion of an example optics system 300 that may include a deformable lens 302 and a piezoelectric actuator arrangement (e.g., comprising one or more piezoelectric actuators 304). FIG. 3B shows a perspective view of the piezoelectric actuator 304. FIG. 3C shows, via a series of example states of the piezoelectric actuator 304 at different points in time, an example of motion that may advance a frame portion of the piezoelectric actuator 304 (and the deformable lens 302) in a first direction (e.g., upwards, parallel to an optical axis) based at least in part on activation of piezoelectric elements. FIG. 3D shows, via a series of example states of the piezoelectric actuator 304 at different points in time, an example of motion that may advance the frame portion (and the deformable lens 302) in a second direction (e.g., downwards, parallel to the optical axis) based at least in part on activation of the piezoelectric elements.

In some embodiments, the optics system 300 may include the deformable lens 302, a piezoelectric actuator arrangement (e.g., comprising the piezoelectric actuators(s) 304), and/or a base structure (e.g., base structure 406 in FIG. 4). The deformable lens 302 may define an optical axis (e.g., the optical axis in FIG. 1A). According to some embodiments, the piezoelectric actuator(s) 304 may include multiple piezoelectric actuators 304 arranged at actuation points that circumferentially surround the deformable lens 302, e.g., as indicated in FIG. 3A.

As indicated at least in FIGS. 3A-3B, in some embodiments a piezoelectric actuator 304 may include a frame (e.g., comprising a first frame portion 306 and a second frame portion 308) that is coupled with one or more piezoelectric elements (e.g., first piezoelectric element 310 and second piezoelectric element 312). In some embodiments, each of the first piezoelectric element 310 and the second piezoelectric element 312 may be a respective piezoelectric stack. The first frame portion 306 may be coupled with the base structure. For example, the first frame portion 306 may be attached to the first piezoelectric element 310, and the first piezoelectric element 310 may be attached to the base structure. In various embodiments, the base structure may comprise one or more components that are stationary relative to drive motion of the second frame portion 308 and/or the deformable lens 302. In some embodiments, the first piezoelectric element 310, when activated, may move the first frame portion 306 in a first direction (e.g., up and down, parallel to the optical axis). According to some embodiments, the second frame portion 308 may be attached to the second piezoelectric element 312, which, when activated, may move at least part of the second frame portion 308 in a second direction (e.g., left and right, orthogonal to the optical axis).

In some embodiments, the first frame portion 306 may include one or more rail surfaces 314 (FIG. 3B) for guiding motion in a direction parallel to the optical axis. The second frame portion 308 may include one or more contact surfaces 316 (FIG. 3B). According to various embodiments, the first piezoelectric element 310 and the second piezoelectric element 312 can be activated to produce relative elliptical motion between the second frame portion 308 and the first frame portion 306. Such relative elliptical motion may cause the contact surface(s) 316 to engage with (e.g., frictional engagement) the rail surface(s) 314 so as to drive motion of at least a portion of the deformable lens 302, e.g., in an upwards or downwards direction, relative to the base structure.

In some embodiments, the piezoelectric actuator 304 may be configured such that a holding position of the second frame portion 308 is maintained when the piezoelectric elements 310 and 312 are not actively being used to drive motion of the deformable lens 302. For example, the piezoelectric actuator 304 may be designed to mechanically maintain the current position of the deformable lens 302, e.g., via tolerancing that results in a friction lock between the rail surface(s) 314 and the contact surface(s) 316, to enable reduced holding power and/or zero holding power.

As previously mentioned, the first piezoelectric element 310 and the second piezoelectric element 312 can be activated to produce relative elliptical motion between at least part of the second frame portion 308 and the first frame portion 306. The relative elliptical motion may cause the contact surface(s) 316 to modulate frictional engagement with the rail surface(s) 314 so as to drive motion of at least a portion of the deformable lens 302, e.g., in an upwards or downwards drive direction, relative to the base structure.

In some embodiments, the drive direction may be determined based at least in part on which piezoelectric element(s) is/are activated, a frequency at which a piezoelectric element is operated, and/or a phase difference between portions of the frame of the actuator 304. As indicated in FIG. 3C, to move the deformable lens 302 in an upwards drive direction, the first piezoelectric element 306 and the second piezoelectric element 308 may be activated with a first phase difference (e.g., a 90 degrees phase difference) between the motion of the rail surface(s) 314 and the motion of the contact surface(s) 316. In some non-limiting examples, the piezoelectric elements 306 and 308 may be operated at a frequency of about 50 kHz.

Upon activation, the first piezoelectric element 306 and the second piezoelectric element 308 may compress and/or expand, and the first phase difference may produce relative elliptical motion as indicated by the series of example states at times t(0)-t(3) in FIG. 3C. In some embodiments, the relative elliptical motion may modulate friction between the contact surface(s) 316 and the rail surface(s) 314, to produce resultant drive forces that advance the second frame portion 308 along the rail surface(s) 314 of the first frame portion 306 in a first drive direction (e.g., an upwards drive direction). In various embodiments, the second frame portion 308 may be fixedly coupled with the deformable lens 302. For example, the second frame portion 308 may be connected (e.g., at connection(s) 318 in FIG. 3A) to a coupling structure 320 (which may be the same as, or similar to, the coupling structure 106 in FIGS. 1A-1B) that at least partially encircles the deformable lens 302. Furthermore, the coupling structure 320 may be attached to the deformable lens 302. In various embodiments, the drive motion of the second frame portion 308 may cause at least a portion of the deformable lens 302 to move in the same drive direction.

As indicated in FIG. 3D, to move the deformable lens 302 in a downwards drive direction, the first piezoelectric element 306 and the second piezoelectric element 308 may be activated with a different, second phase difference (e.g., a 270 degrees phase difference) between the motion of the rail surface(s) 314 and the motion of the contact surface(s) 316. In some non-limiting examples, the piezoelectric elements 306 and 308 may be operated at a frequency of about 50 kHz.

Upon activation, the first piezoelectric element 306 and the second piezoelectric element 308 may compress and/or expand, and the second phase difference may produce relative elliptical motion as indicated by the series of example states at times t(0)-t(3) in FIG. 3D. In some embodiments, the relative elliptical motion may modulate friction between the contact surface(s) 316 and the rail surface(s) 314, to produce resultant drive forces that advance the second frame portion 308 along the rail surface(s) 314 of the first frame portion 306 in a second drive direction (e.g., a downwards drive direction) that is opposite the first drive direction.

In various embodiments, the first piezoelectric element 310 may have a first orientation, and the second piezoelectric element 312 may have a second orientation different from the first orientation. For example, the first piezoelectric element 310 may be oriented in a different direction than the second piezoelectric element 312. In some embodiments, the first piezoelectric element 310 may be vertically oriented (e.g., parallel to the optical axis) and the second piezoelectric element 312 may be horizontally oriented (e.g., orthogonal to first piezoelectric element 310 and/or the optical axis).

Figure 4A:
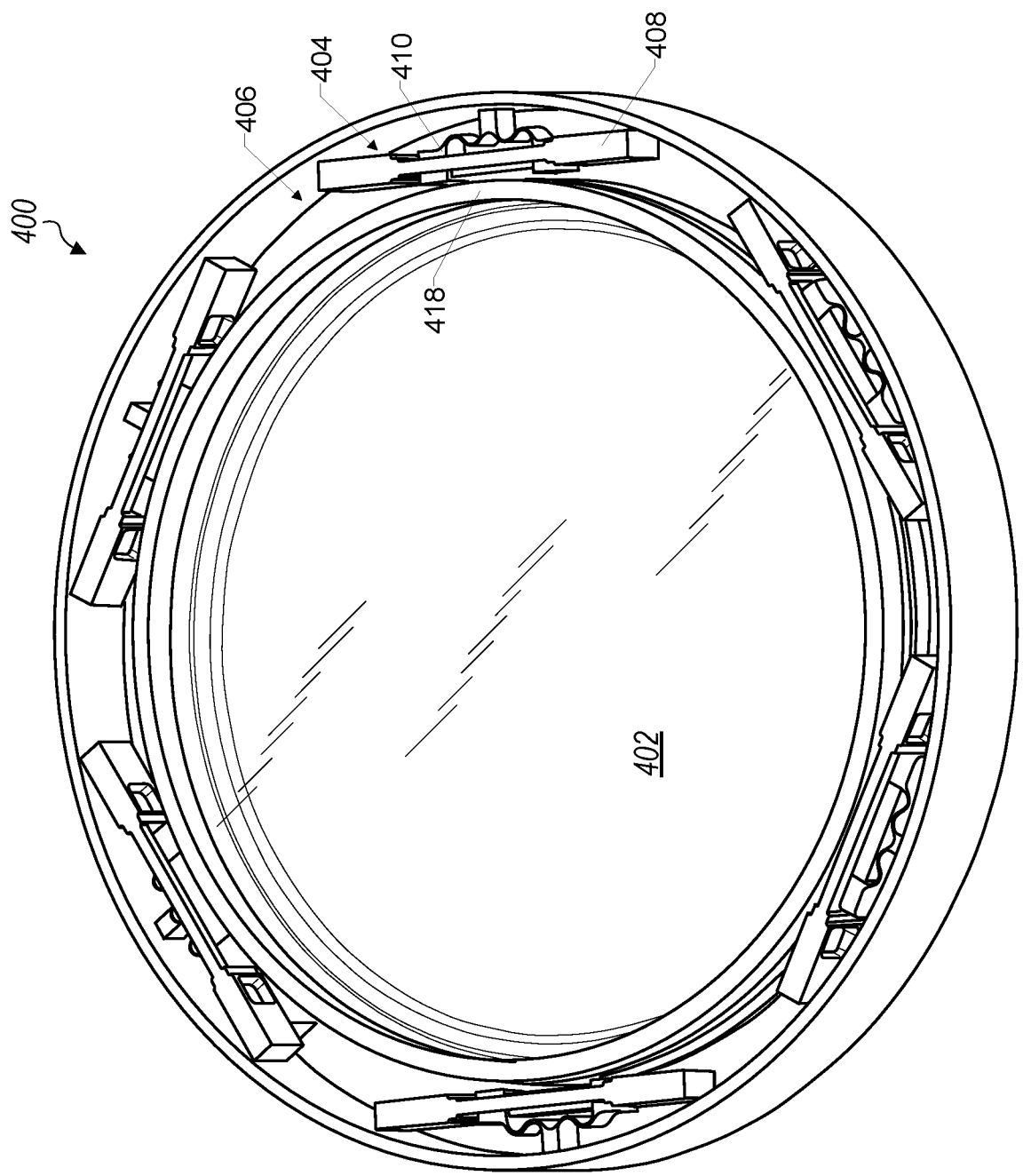
FIGS. 4A-4D illustrate aspects of yet another example piezoelectric actuator that may be used to drive motion of a deformable lens in an optics system, in accordance with some embodiments.
Figure 4B:
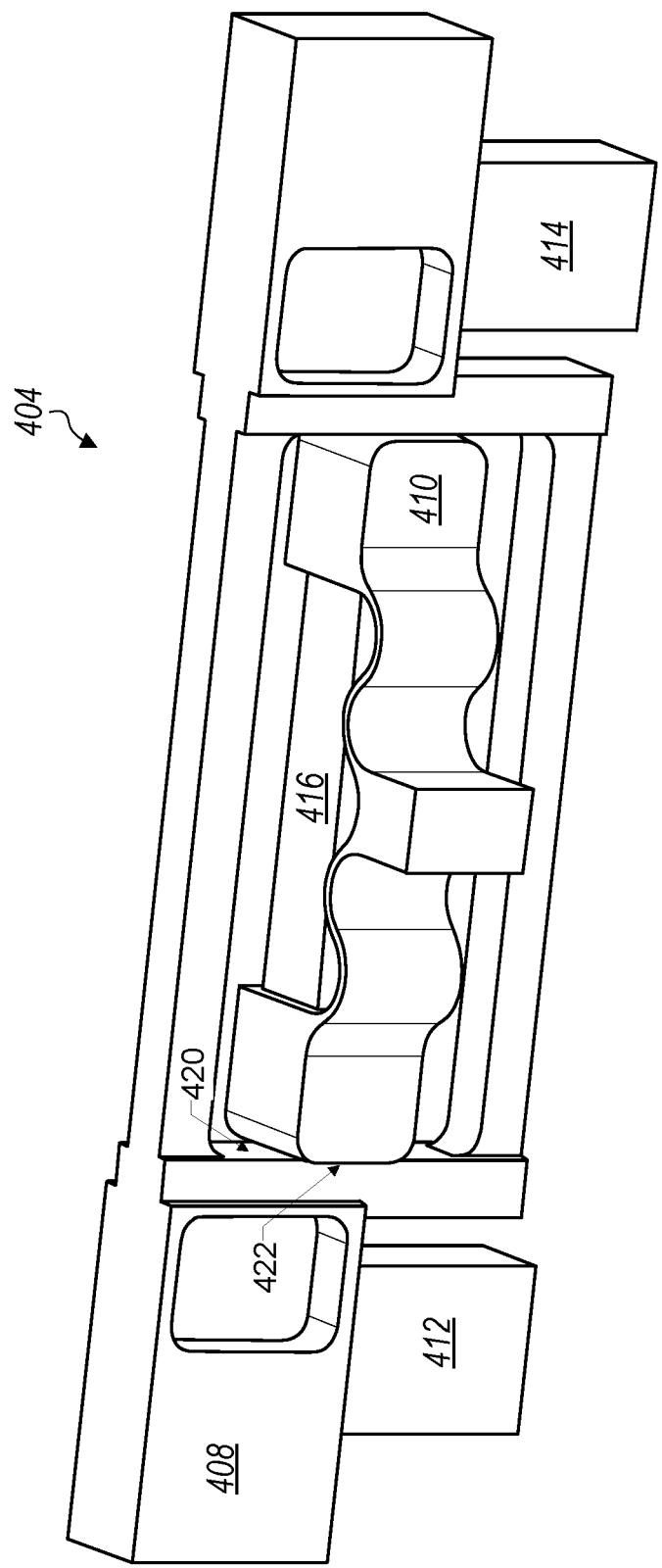
Figure 4C:
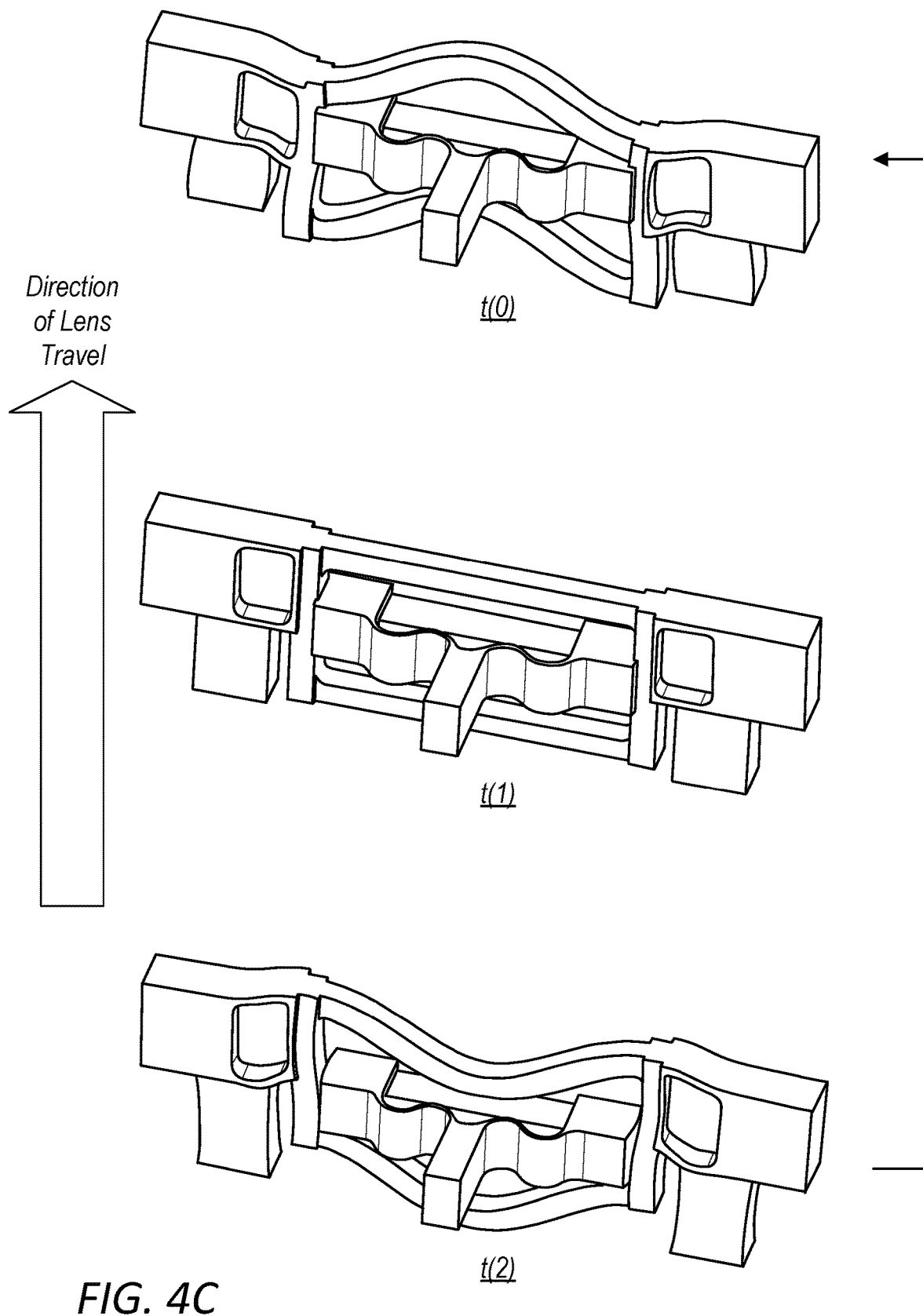
Figure 4D:
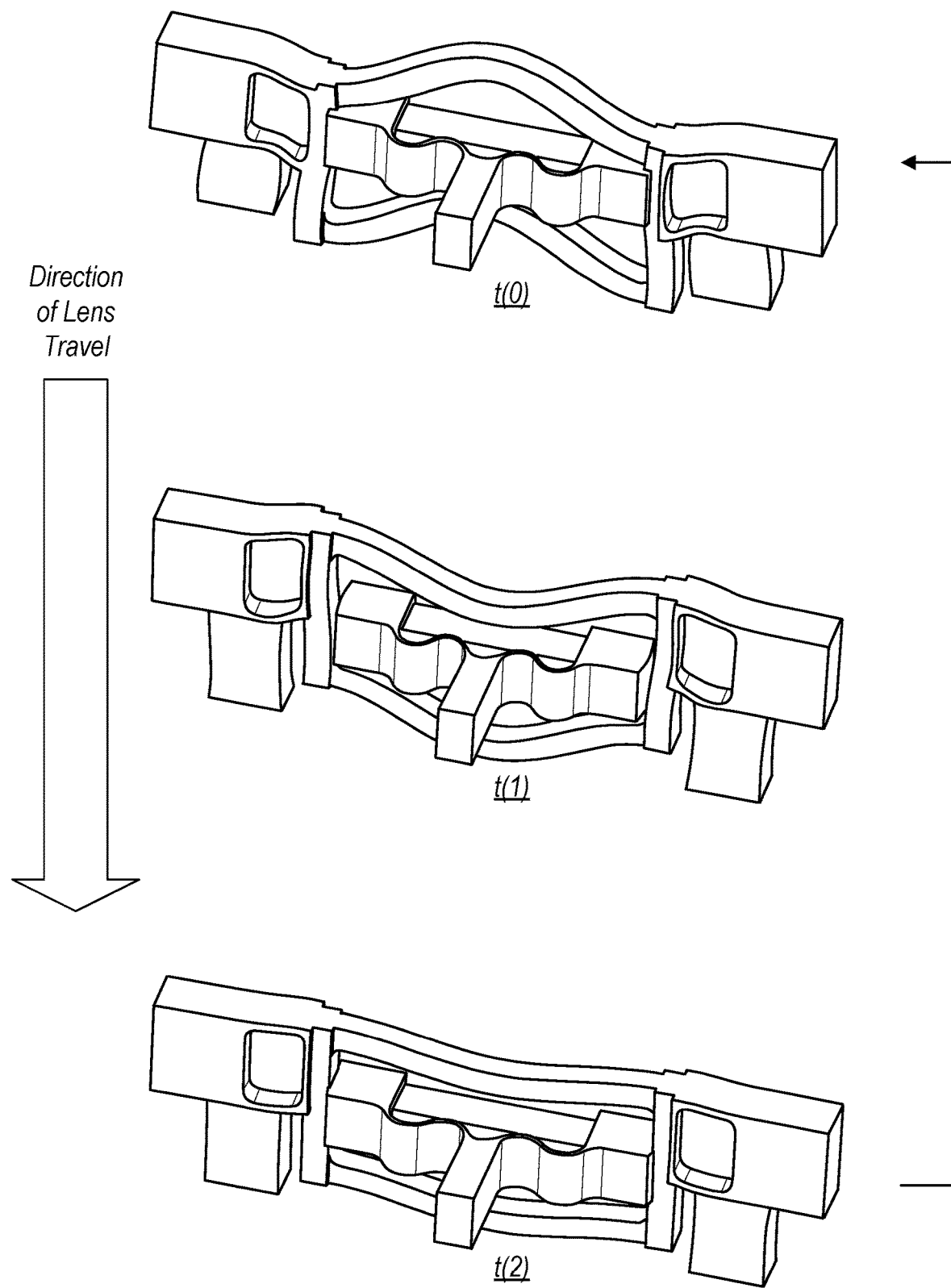

FIGS. 4A-4D illustrate aspects of yet another example piezoelectric actuator that may be used to drive motion of a deformable lens in an optics system, in accordance with some embodiments. FIG. 4A shows a perspective view of a portion of an example optics system 400 that may include a deformable lens 402 and a piezoelectric actuator arrangement (e.g., comprising one or more piezoelectric actuators 404). FIG. 4B shows a perspective view of the piezoelectric actuator 404. FIG. 4C shows, via a series of example states of the piezoelectric actuator 404 at different points in time, an example of motion that may advance a frame portion of the piezoelectric actuator 404 (and the deformable lens 402) in a first direction (e.g., upwards, parallel to an optical axis) based at least in part on activation of piezoelectric elements. FIG. 4D shows, via a series of example states of the piezoelectric actuator 404 at different points in time, an example of motion that may advance the frame portion (and the deformable lens 402) in a second direction (e.g., downwards, parallel to the optical axis) based at least in part on activation of the piezoelectric elements.

In some embodiments, the optics system 400 may include the deformable lens 402, a piezoelectric actuator arrangement (e.g., comprising the piezoelectric actuators(s) 404), and/or a base structure 406. The deformable lens 402 may define an optical axis (e.g., the optical axis in FIG. 1A). According to some embodiments, the piezoelectric actuator(s) 404 may include multiple piezoelectric actuators 404 arranged at actuation points that circumferentially surround the deformable lens 402, e.g., as indicated in FIG. 4A.

As indicated at least in FIGS. 4A-4B, in some embodiments a piezoelectric actuator 404 may include a frame (e.g., comprising a first frame portion 408 and a second frame portion 410) that is coupled with one or more piezoelectric elements (e.g., a first set of piezoelectric elements 412 and 414 and a second set of piezoelectric element(s) 416). In some embodiments, each of the piezoelectric elements 412, 414, and 416 may be a respective piezoelectric stack. The first frame portion 408 may be coupled with the base structure 406. For example, the first frame portion 408 may be attached to the first set of piezoelectric elements 412 and 414, and each of the first set of piezoelectric elements 412 and 414 may be attached to the base structure 406. In various embodiments, the base structure 406 may comprise one or more components that are stationary relative to drive motion of the second frame portion 410 and/or the deformable lens 402. The second frame portion 410 may be coupled with the deformable lens 402, e.g., via a coupling structure 418 (which may be the same as, or similar to, the coupling structure 106 in FIGS. 1A-1B) that at least partially encircles the deformable lens 402. In some embodiments, the first set of piezoelectric elements 412 and 414, when activated, may move the first frame portion 408 in a first direction (e.g., up and down, parallel to the optical axis). According to some embodiments, the second frame portion 410 may be attached to the second set of piezoelectric element(s) 416, which, when activated, may move the ends of the second frame portion 410 in opposite directions (e.g., left and right, orthogonal to the optical axis).

In some embodiments, the first frame portion 408 may include one or more rail surfaces 420 (FIG. 4B) for guiding motion in a direction parallel to the optical axis. The second frame portion 410 may include one or more contact surfaces 422, e.g., two contact surfaces 422 at opposite sides of the second frame portion 410 as indicated in FIG. 4B. According to various embodiments, the first set of piezoelectric elements 412 and 414 and the second set of piezoelectric element(s) 416 can be activated to produce relative elliptical motion between the second frame portion 410 and the first frame portion 408. Such relative elliptical motion may cause the contact surfaces 422 to engage with (e.g., frictional engagement) the corresponding rail surfaces 420 so as to drive motion of at least a portion of the deformable lens 402, e.g., in an upwards or downwards direction, relative to the base structure 406.

In some embodiments, the piezoelectric actuator 404 may be configured such that a holding position of the second frame portion 410 is maintained when the piezoelectric elements 412, 414, and 416 are not actively being used to drive motion of the deformable lens 402. For example, the piezoelectric actuator 404 may be designed to mechanically maintain the current position of the deformable lens 402, e.g., via tolerancing that results in a friction lock between the rail surfaces 420 and the contact surfaces 422, to enable reduced holding power and/or zero holding power.

As previously mentioned, the piezoelectric elements 412, 414, and 416 can be activated to produce relative elliptical motion between the second frame portion 410 and the first frame portion 408. The relative elliptical motion may cause the contact surfaces 422 to modulate frictional engagement with the rail surfaces 420 so as to drive motion of at least a portion of the deformable lens 402, e.g., in an upwards or downwards drive direction, relative to the base structure 406.

In some embodiments, the drive direction may be determined based at least in part on which piezoelectric element(s) is/are activated, a frequency at which a piezoelectric element is operated, and/or a phase difference between portions of the frame of the actuator 404. As indicated in FIG. 4C, to move the deformable lens 402 in an upwards drive direction, the first set of piezoelectric elements 412 and 414 and the second set of piezoelectric element(s) 416 may be activated with a first phase difference (e.g., a 90 degrees phase difference) between the motion of the rail surfaces 420 and the motion of the contact surfaces 422. In some non-limiting examples, the piezoelectric elements 412, 414, and 416 may be operated at a frequency of about 76 kHz.

Upon activation, the first set of piezoelectric elements 412 and 414 and the second set of piezoelectric element(s) 416 may compress and/or expand, and the first phase difference may produce relative elliptical motion as indicated by the series of example states at times t(0)-t(2) in FIG. 4C. In some embodiments, the relative elliptical motion may modulate friction between the contact surfaces 422 and the rail surfaces 420, to produce resultant drive forces that advance the second frame portion 410 along the rail surfaces 420 of the first frame portion 408 in a first drive direction (e.g., an upwards drive direction). In various embodiments, the second frame portion 410 may be fixedly coupled with the deformable lens 402. In various embodiments, the drive motion of the second frame portion 410 may cause at least a portion of the deformable lens 402 to move in the same drive direction.

As indicated in FIG. 4D, to move the deformable lens 402 in a downwards drive direction, the first set of piezoelectric elements 412 and 414 and the second set of piezoelectric element(s) 416 may be activated with a different, second phase difference (e.g., a 270 degrees phase difference) between the motion of the rail surfaces 420 and the motion of the contact surfaces 422. In some non-limiting examples, the piezoelectric elements 412, 414, and 416 may be operated at a frequency of about 76 kHz.

Upon activation, the first set of piezoelectric elements 412 and 414 and the second set of piezoelectric element(s) 416 may compress and/or expand, and the second phase difference may produce relative elliptical motion as indicated by the series of example states at times t(0)-t(2) in FIG. 4D. In some embodiments, the relative elliptical motion may modulate friction between the contact surfaces 422 and the rail surfaces 420, to produce resultant drive forces that advance the second frame portion 410 along the rail surfaces 420 of the first frame portion 408 in a second drive direction (e.g., a downwards drive direction) that is opposite the first drive direction.

In various embodiments, the first set of piezoelectric elements 412 and 414 may have a first orientation, and the second set of piezoelectric element(s) 416 may have a second orientation different from the first orientation. For example, the first set of piezoelectric elements 412 and 414 may be oriented in a different direction than the second set of piezoelectric element(s) 416. In some embodiments, the first set of piezoelectric elements 412 and 414 may be vertically oriented (e.g., parallel to the optical axis) and the second set of piezoelectric element(s) 416 may be horizontally oriented (e.g., orthogonal to first set of piezoelectric elements 412 and 414 and/or the optical axis).

Figure 5A:
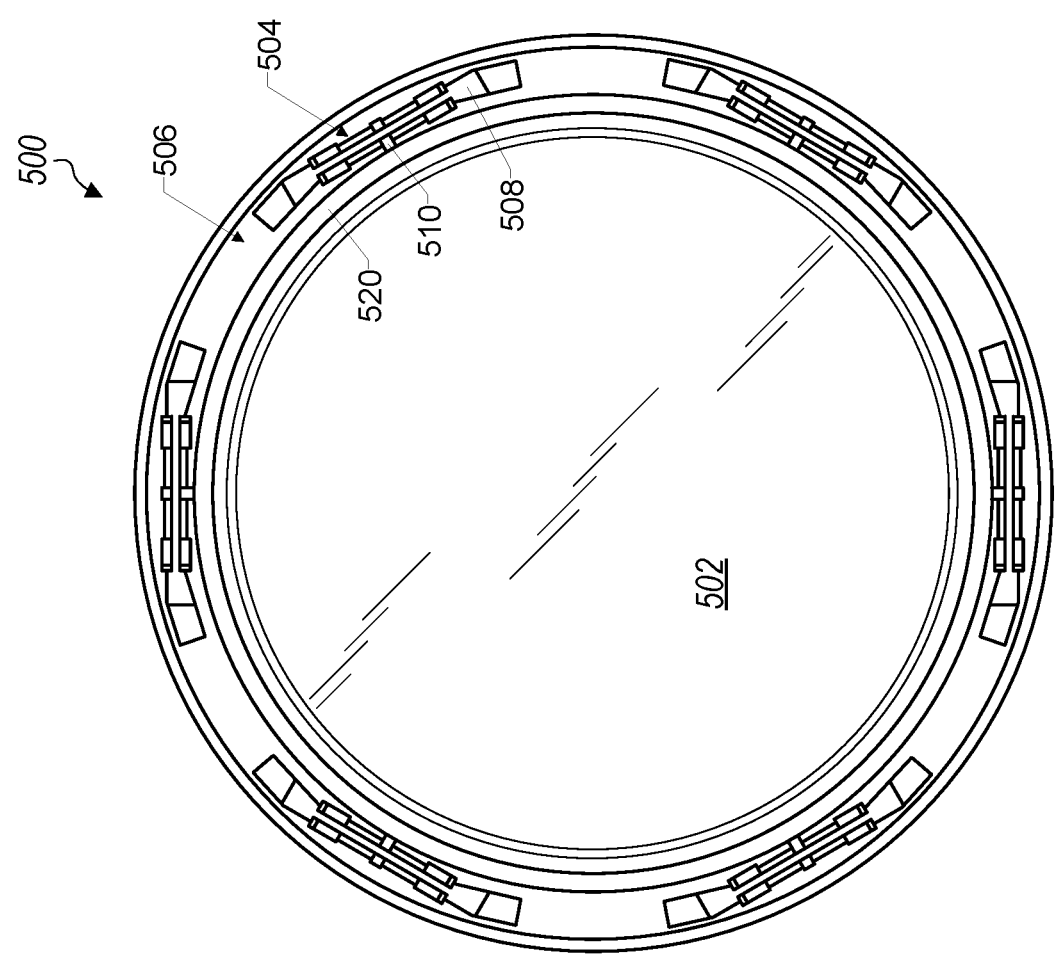
FIGS. 5A-5D illustrate aspects of still yet another example piezoelectric actuator that may be used to drive motion of a deformable lens in an optics system, in accordance with some embodiments.
Figure 5B:
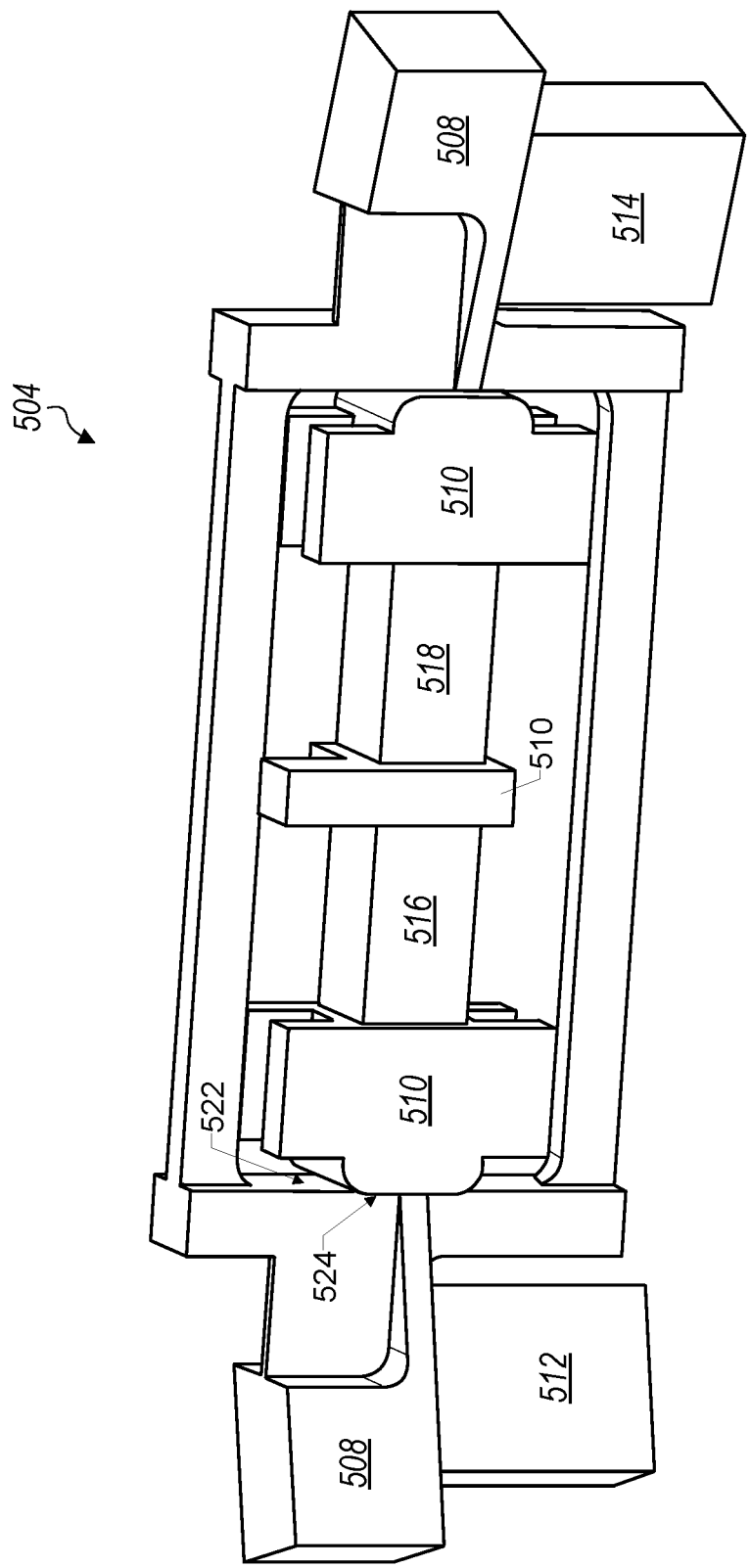
Figure 5C:
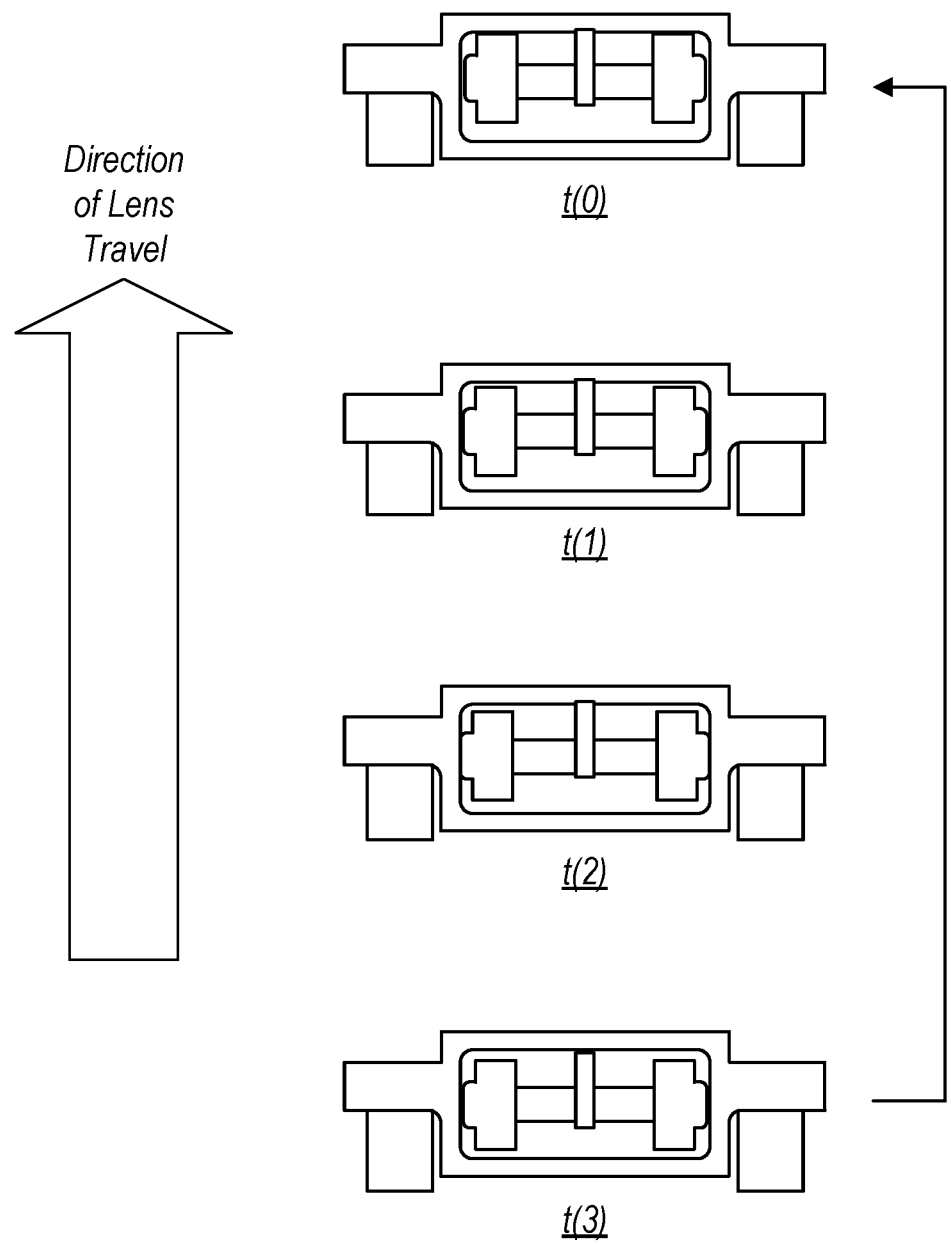
Figure 5D:
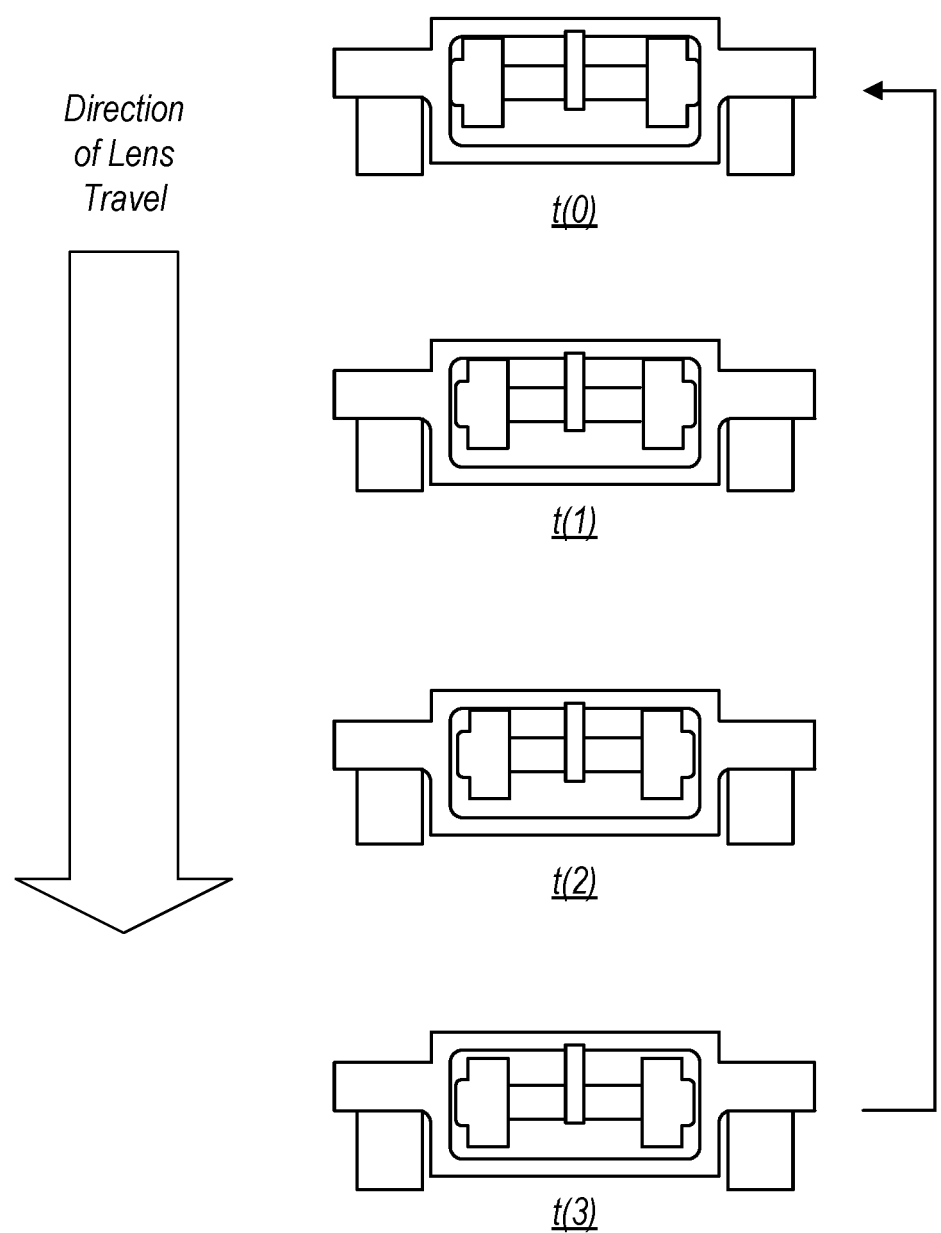

FIGS. 5A-5D illustrate aspects of still yet another example piezoelectric actuator that may be used to drive motion of a deformable lens in an optics system, in accordance with some embodiments. FIG. 5A shows a perspective view of a portion of an example optics system 500 that may include a deformable lens 502 and a piezoelectric actuator arrangement (e.g., comprising one or more piezoelectric actuators 504). FIG. 5B shows a perspective view of the piezoelectric actuator 504. FIG. 5C shows, via a series of example states of the piezoelectric actuator 504 at different points in time, an example of motion that may advance a frame portion of the piezoelectric actuator 504 (and the deformable lens 502) in a first direction (e.g., upwards, parallel to an optical axis) based at least in part on activation of piezoelectric elements. FIG. 5D shows, via a series of example states of the piezoelectric actuator 504 at different points in time, an example of motion that may advance the frame portion (and the deformable lens 502) in a second direction (e.g., downwards, parallel to the optical axis) based at least in part on activation of the piezoelectric elements.

In some embodiments, the optics system 500 may include the deformable lens 502, a piezoelectric actuator arrangement (e.g., comprising the piezoelectric actuators(s) 504), and/or a base structure 506. The deformable lens 502 may define an optical axis (e.g., the optical axis in FIG. 1A). According to some embodiments, the piezoelectric actuator(s) 504 may include multiple piezoelectric actuators 504 arranged at actuation points that circumferentially surround the deformable lens 502, e.g., as indicated in FIG. 5A.

As indicated at least in FIGS. 5A-5B, in some embodiments a piezoelectric actuator 504 may include a frame (e.g., comprising a first frame portion 508 and a second frame portion 510) that is coupled with one or more piezoelectric elements (e.g., a first set of piezoelectric elements 512 and 514 and a second set of piezoelectric elements 516 and 518). In some embodiments, each of the piezoelectric elements 512, 514, 516, and 518 may be a respective piezoelectric stack. The first frame portion 508 may be coupled with the base structure 506. For example, the first frame portion 508 may be attached to the first set of piezoelectric elements 512 and 514, and each of the first set of piezoelectric elements 512 and 514 may be attached to the base structure 506. In various embodiments, the base structure 506 may comprise one or more components that are stationary relative to drive motion of the second frame portion 510 and/or the deformable lens 502. The second frame portion 510 may be coupled with the deformable lens 502, e.g., via a coupling structure 520 (which may be the same as, or similar to, the coupling structure 106 in FIGS. 1A-1B) that at least partially encircles the deformable lens 502. In some embodiments, the first set of piezoelectric elements 512 and 514, when activated, may move the first frame portion 508 in a first direction (e.g., up and down, parallel to the optical axis). According to some embodiments, the second frame portion 510 may be attached to the second set of piezoelectric elements 516 and 518 (e.g., as indicated in FIG. 5B), which, when activated, may move the ends of the second frame portion 510 in opposite directions (e.g., left and right, orthogonal to the optical axis).

In some embodiments, the first frame portion 508 may include one or more rail surfaces 522 (FIG. 5B) for guiding motion in a direction parallel to the optical axis. The second frame portion 510 may include one or more contact surfaces 524, e.g., two contact surfaces 524 at opposite sides of the second frame portion 510 as indicated in FIG. 5B. According to various embodiments, the first set of piezoelectric elements 512 and 514 and the second set of piezoelectric elements 516 and 518 can be activated to produce relative elliptical motion between the second frame portion 510 and the first frame portion 508. Such relative elliptical motion may cause the contact surfaces 524 to engage with (e.g., frictional engagement) the corresponding rail surfaces 522 so as to drive motion of at least a portion of the deformable lens 502, e.g., in an upwards or downwards direction, relative to the base structure 506.

In some embodiments, the piezoelectric actuator 504 may be configured such that a holding position of the second frame portion 510 is maintained when the piezoelectric elements 512, 514, 516, and 518 are not actively being used to drive motion of the deformable lens 502. For example, the piezoelectric actuator 504 may be designed to mechanically maintain the current position of the deformable lens 502, e.g., via tolerancing that results in a friction lock between the rail surfaces 522 and the contact surfaces 524, to enable reduced holding power and/or zero holding power.

As previously mentioned, the piezoelectric elements 512, 514, 516, and 518 can be activated to produce relative elliptical motion between the second frame portion 510 and the first frame portion 508. The relative elliptical motion may cause the contact surfaces 524 to modulate frictional engagement with the rail surfaces 522 so as to drive motion of at least a portion of the deformable lens 502, e.g., in an upwards or downwards drive direction, relative to the base structure 506.

In some embodiments, the drive direction may be determined based at least in part on which piezoelectric element(s) is/are activated, a frequency at which a piezoelectric element is operated, and/or a phase difference between portions of the frame of the actuator 504. As indicated in FIG. 5C, to move the deformable lens 502 in an upwards drive direction, the first set of piezoelectric elements 512 and 514 and the second set of piezoelectric elements 516 and 518 may be activated with a first phase difference (e.g., a 90 degrees phase difference) between the motion of the rail surfaces 522 and the motion of the contact surfaces 524. In some non-limiting examples, the piezoelectric elements 512, 514, 516, and 518 may be operated at a frequency of about 67 kHz.

Upon activation, the first set of piezoelectric elements 512 and 514 and the second set of piezoelectric elements 516 and 518 may compress and/or expand, and the first phase difference may produce relative elliptical motion as indicated by the series of example states at times t(0)-t(3) in FIG. 5C. In some embodiments, the relative elliptical motion may modulate friction between the contact surfaces 524 and the rail surfaces 522, to produce resultant drive forces that advance the second frame portion 510 along the rail surfaces 522 of the first frame portion 508 in a first drive direction (e.g., an upwards drive direction). In various embodiments, the second frame portion 510 may be fixedly coupled with the deformable lens 502. In various embodiments, the drive motion of the second frame portion 510 may cause at least a portion of the deformable lens 502 to move in the same drive direction.

As indicated in FIG. 5D, to move the deformable lens 502 in a downwards drive direction, the first set of piezoelectric elements 512 and 514 and the second set of piezoelectric elements 516 and 518 may be activated with a different, second phase difference (e.g., a 270 degrees phase difference) between the motion of the rail surfaces 522 and the motion of the contact surfaces 524. In some non-limiting examples, the piezoelectric elements 512, 514, 516, and 518 may be operated at a frequency of about 67 kHz.

Upon activation, the first set of piezoelectric elements 512 and 514 and the second set of piezoelectric elements 516 and 518 may compress and/or expand, and the second phase difference may produce relative elliptical motion as indicated by the series of example states at times t(0)-t(3) in FIG. 5D. In some embodiments, the relative elliptical motion may modulate friction between the contact surfaces 422 and the rail surfaces 420, to produce resultant drive forces that advance the second frame portion 510 along the rail surfaces 522 of the first frame portion 508 in a second drive direction (e.g., a downwards drive direction) that is opposite the first drive direction.

In various embodiments, the first set of piezoelectric elements 512 and 514 may have a first orientation, and the second set of piezoelectric elements 516 and 518 may have a second orientation different from the first orientation. For example, the first set of piezoelectric elements 512 and 514 may be oriented in a different direction than the second set of piezoelectric elements 516 and 518. In some embodiments, the first set of piezoelectric elements 512 and 514 may be vertically oriented (e.g., parallel to the optical axis) and the second set of piezoelectric elements 516 and 518 may be horizontally oriented (e.g., orthogonal to first set of piezoelectric elements 512 and 514 and/or the optical axis).

Figure 6:
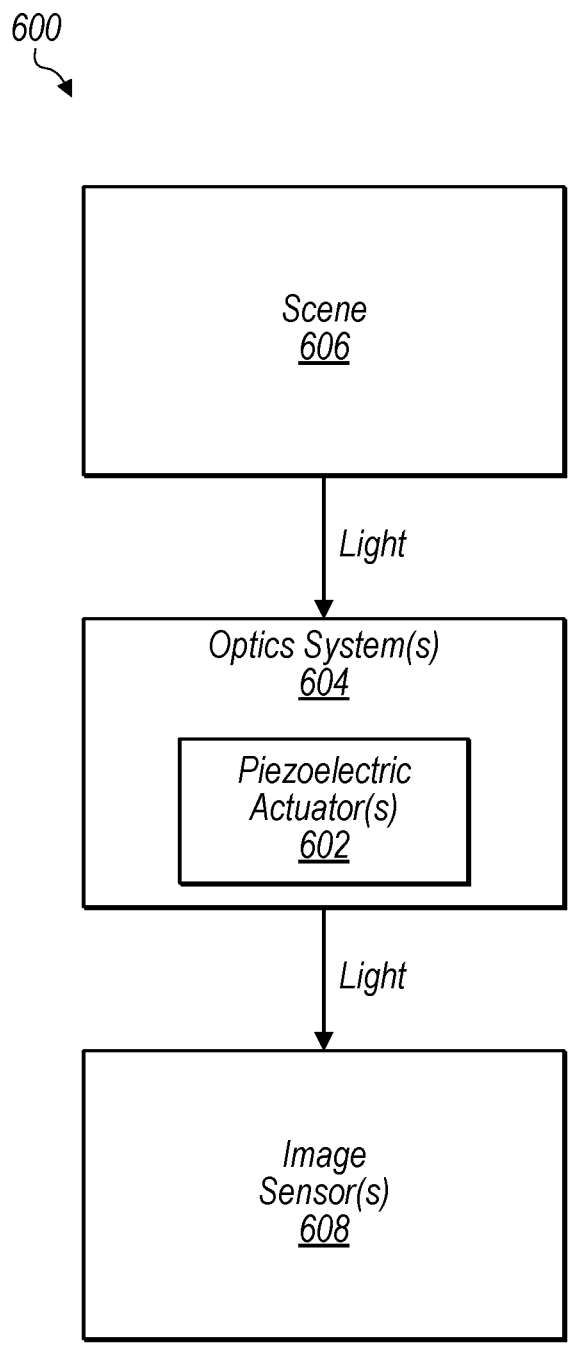
FIG. 6 illustrates a block diagram of an example environment in which one or more piezoelectric actuators may be used, in accordance with some embodiments.

FIG. 6 illustrates a block diagram of an example environment 600 in which one or more piezoelectric actuators 602 may be used, in accordance with some embodiments. The example environment 600 may include one or more optics systems 604 (e.g., the optics system 100 in FIGS. 1A-1B) comprising the piezoelectric actuator(s) 402 (e.g., one or more of the piezoelectric actuators described herein with reference to FIGS. 1A-5D and 7). Furthermore, the environment 600 may include a scene 606 and/or one or more image sensors 608. In various embodiments, the optics system(s) 604 may receive light emitted (and/or reflected) from the scene 606. In some embodiments, the light may pass through the optics system(s) 604 and to the image sensor(s) 608, which may be configured to receive the light that has passed through the optics system(s) 604.

According to some embodiments, at least a portion of the optics system(s) 604 and at least a portion of the image sensor(s) 608 may be part of a camera that may be used for capturing images (e.g., still image capture and/or video capture of the scene 606). The piezoelectric actuator(s) 602 may be included in the camera and/or in one or more optical systems that are not part of the camera.

In some embodiments, the scene 606 may include an electronic display, and the optics system(s) may receive light from the electronic display. Additionally, or alternatively, the image sensor(s) 608 may include a human eye. In some embodiments, one or more portions (e.g., a pupil and/or a lens, etc.) of a human eye may be considered part of the optics system(s) 604 and one or more other portions (e.g., a retina) of the human eye may be considered part of the image sensor(s) 608.

According to some embodiments, the example environment 600 may be a display system that includes a left optics system and a right optics system positioned between a user's eyes and one or more displays. In some embodiments, the scene 606 may be a single display to display content for viewing by both of the user's eyes. In other embodiments, the scene 606 may include multiple displays (e.g., two displays-a left display for a user's left eye and a right display for a user's right eye). The optics system(s) 604 may include the left optics system (e.g., optics system 100 in FIG. 1A) positioned between the scene 606 and the user's left eye, and a right optics system (e.g., optics system 100 in FIG. 1A) positioned between the scene 606 and the user's right eye. In some embodiments, the image sensor(s) 608 may include the user's left eye and/or right eye. According to some embodiments, the display (or a left display), the left optics system, and the user's left eye may be positioned along an optical axis defined by a lens assembly of the left optics system. Additionally, or alternatively, the display (and/or a right display), the right optics system, and the user's right eye may be positioned along an optical axis defined by a lens assembly of the right optics system.

Figure 7:
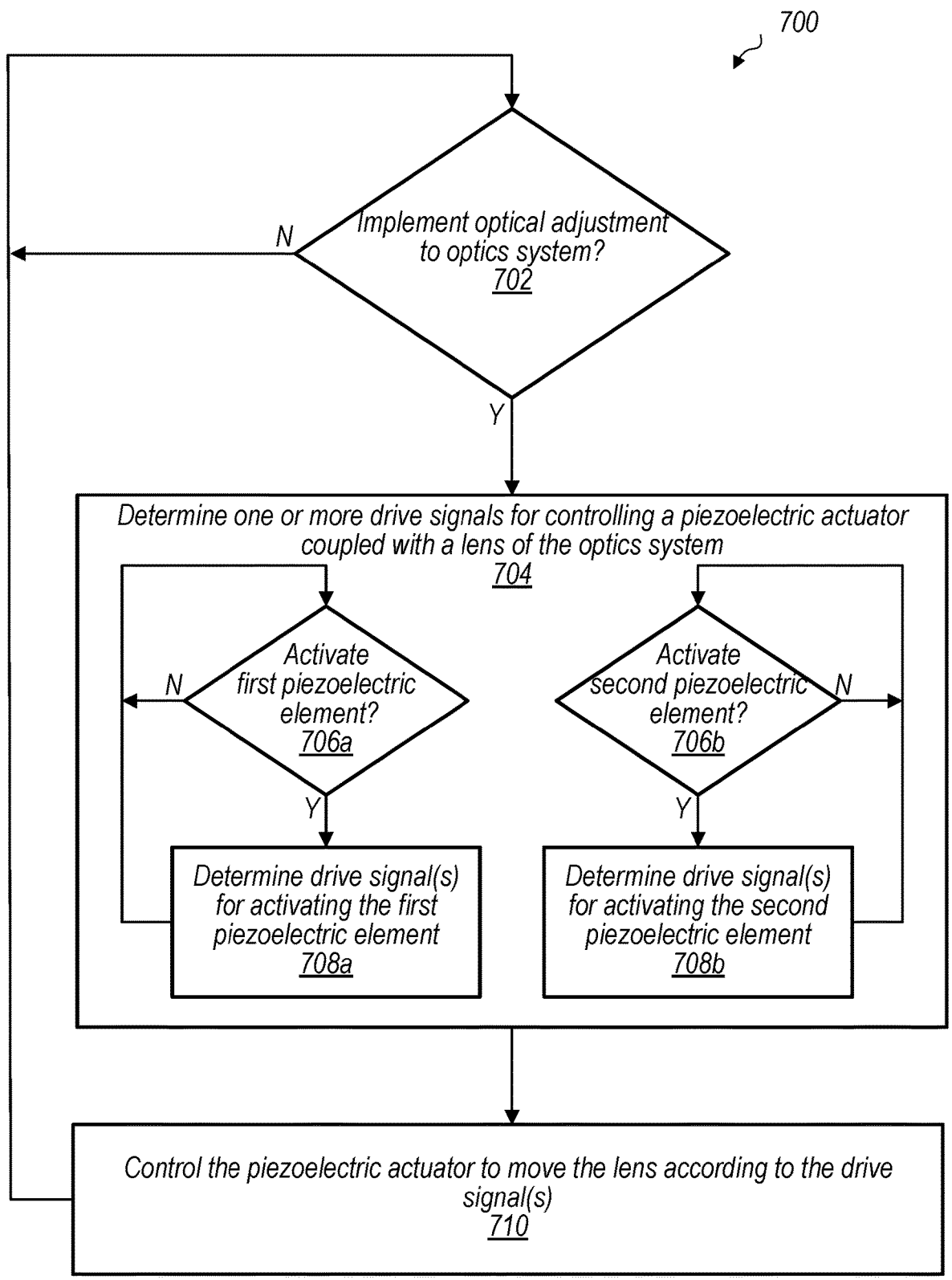
FIG. 7 is a flowchart of an example method of controlling one or more piezoelectric actuators to drive a deformable lens, in accordance with some embodiments.

FIG. 7 is a flowchart of an example method 700 of controlling one or more piezoelectric actuators (e.g., one or more of the piezoelectric actuators described herein with reference to FIGS. 1A-6) to drive a lens (e.g., a deformable lens). It should be understood that, in various implementations, the method 700 may include fewer or more operations that those indicated by blocks 702-710.

At 702, the method 700 may include determining whether to implement one or more optical adjustments to an optics system (e.g., optics system 100 in FIGS. 1A-1B, optics system 200 in FIG. 2A, optics system 300 in FIG. 3A, optics system 400 in FIG. 4A, optics system 500 in FIG. 5A, etc.). In some embodiments, one or more processors (and/or one or more controllers) may determine to whether to implement the optical adjustment(s). In some examples, the optical adjustment(s) may include an optical power adjustment of a lens (e.g., a deformable lens) of the optics system. Additionally, or alternatively, the optical adjustment(s) may include a cylindrical component adjustment of the lens (e.g., so that the lens has different optical powers along different axes).

As previously mentioned, in some embodiments the optics system may be configured to be disposed in front of a user's eye(s) such that light passes through the lens and/or one or more other optical elements of the optics system before the light reaches the user's eye(s). In some embodiments, the optics system may be used for correcting user eye prescription. As a non-limiting example, varying the optical power (e.g., by implementing an optical power adjustment) of the lens may enable the optics system to correct for myopia. As another non-limiting example, varying a cylindrical component (e.g., by implementing a cylindrical component adjustment) of the lens may enable the optics system to correct for astigmatism.

If, at, 702, it is determined to not implement optical adjustment(s), then the method 700 may continue checking whether to implement optical adjustment(s) (at 700). If, at 702, it is determined to implement optical adjustment(s), then the method 700 may proceed to 704.

At 704, the method 700 may include determining one or more drive signals for controlling a piezoelectric actuator coupled with the lens of the optics system, e.g., so as to implement the optical adjustment(s). In some embodiments, determining the drive signal(s) may include determining respective sets of one or more drive signal(s) for one or more piezoelectric elements (e.g., piezoelectric stacks) of the piezoelectric actuator. For example, at 706a, the method 700 may include determining whether a first piezoelectric actuator is to be activated to implement the optical adjustment(s). If, at 706a, it is determined that the first piezoelectric actuator is to be activated, then the method 700 may proceed to determining drive signal(s) for activating the first piezoelectric element (at 708a). Similarly, at 706b, the method 700 may include determining whether a second piezoelectric actuator is to be activated to implement the optical adjustment(s). If, at 706b, it is determined that the second piezoelectric actuator is to be activated, then the method 700 may proceed to determining drive signal(s) for activating the second piezoelectric element (at 708b).

According to various embodiments, the processor(s) may determine a drive direction for the lens, e.g., to achieve the optical adjustment(s). In some embodiments, the drive signal(s) may be associated with an operational frequency for one or more of the piezoelectric elements and/or a phase difference between portions of the frame of the piezoelectric actuator, e.g., as discussed herein with reference to FIGS. 2E-2F, 3C-3D, 4C-4D, and 5C-5D.

If, at, 706a, it is determined that the first piezoelectric actuator is not to be activated in the implementation of the optical adjustment(s), then the method 700 may continue checking whether the first piezoelectric actuator is to be activated (at 706a) in some embodiments. Similarly, if, at 706b, it is determined that the second piezoelectric actuator is not to be activated in the implementation of the optical adjustment(s), then the method 700 may continue checking whether the second piezoelectric actuator is to be activated (at 706*b*) in some embodiments.

While FIG. 7 refers to two piezoelectric elements, it should be understood that the piezoelectric actuator may include a different number of piezoelectric elements. For example, in some embodiments, the piezoelectric actuator 404 in FIG. 4B includes three piezoelectric elements (412, 414, and 416), and the piezoelectric actuator 504 in FIG. 5B includes four piezoelectric elements (512, 514, 516, and 518). The method 700 may include making determinations like those of 706*a*, 708*a*, 706*b*, and/or 708*b* that are specific to any number of piezoelectric elements of the piezoelectric actuator in various embodiments.

At 710, the method 700 may include controlling the piezoelectric actuator to move the lens according to the drive signal(s). Various examples of manners in which piezoelectric actuators may be controlled are described herein with reference to FIGS. 1A-6.

Figure 8:
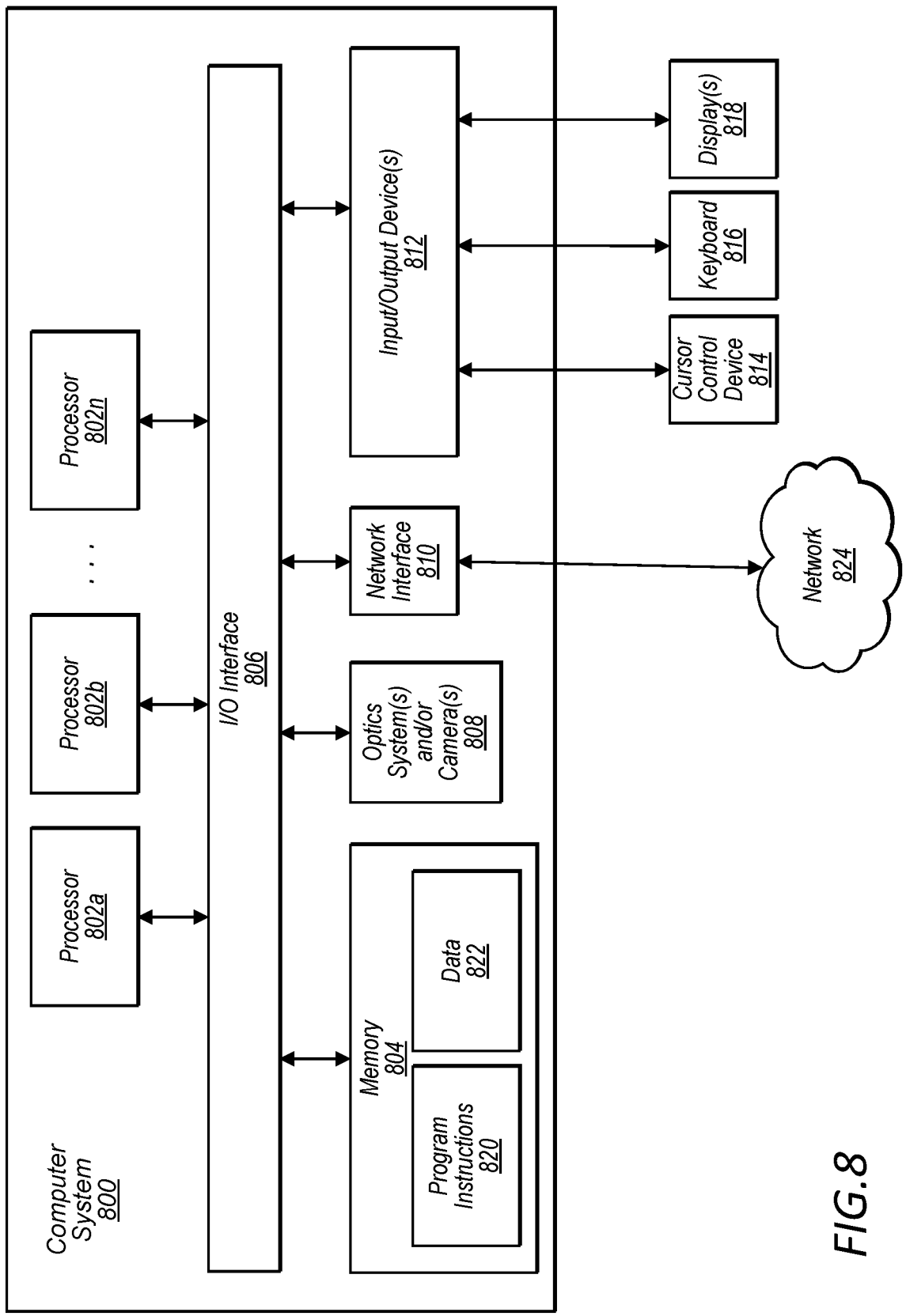
FIG. 8 illustrates an example computer system that may include an optics system with one or more piezoelectric actuators, in accordance with some embodiments.

FIG. 8 illustrates an example computing device, referred to as computer system 800, that may include or host embodiments of an optics system that may include an optics system with one or more piezoelectric actuators, e.g., as described herein with reference to FIGS. 1A-7. In addition, computer system 800 may implement methods for controlling operations of the optics system.

The computer system 800 may be configured to execute any or all of the embodiments described above. In different embodiments, computer system 800 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 800 includes one or more processors 802 coupled to a system memory 804 via an input/output (I/O) interface 806. Computer system 800 further includes one or more optics systems (and/or one or more cameras) 808 coupled to the I/O interface 806. Computer system 800 further includes a network interface 810 coupled to I/O interface 806, and one or more input/output devices 812, such as cursor control device 814, keyboard 816, and display(s) 818. In some cases, it is contemplated that embodiments may be implemented using a single instance of computer system 800, while in other embodiments multiple such systems, or multiple nodes making up computer system 800, may be configured to host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 802, or a multiprocessor system including several processors 802 (e.g., two, four, eight, or another suitable number). Processors 802 may be any suitable processor capable of executing instructions. For example, in various embodiments processors 802 may be general-purpose or embedded processors implementing any of a variety of instruction set architectures (ISAs), such as the x86, PowerPC, SPARC, or MIPS ISAs, or any other suitable ISA. In multiprocessor systems, each of processors 802 may commonly, but not necessarily, implement the same ISA.

System memory 804 may be configured to store program instructions 820 accessible by processor 802. In various embodiments, system memory 804 may be implemented using any suitable memory technology, such as static random access memory (SRAM), synchronous dynamic RAM (SDRAM), nonvolatile/Flash-type memory, or any other type of memory. Additionally, existing camera control data 822 of memory 804 may include any of the information or data structures described above. In some embodiments, program instructions 820 and/or data 822 may be received, sent or stored upon different types of computer-accessible media or on similar media separate from system memory 804 or computer system 800. In various embodiments, some or all of the functionality described herein may be implemented via such a computer system 800.

In one embodiment, I/O interface 806 may be configured to coordinate I/O traffic between processor 802, system memory 804, and any peripheral devices in the device, including network interface 810 or other peripheral interfaces, such as input/output devices 812. In some embodiments, I/O interface 806 may perform any necessary protocol, timing or other data transformations to convert data signals from one component (e.g., system memory 804) into a format suitable for use by another component (e.g., processor 802). In some embodiments, I/O interface 806 may include support for devices attached through various types of peripheral buses, such as a variant of the Peripheral Component Interconnect (PCI) bus standard or the Universal Serial Bus (USB) standard, for example. In some embodiments, the function of I/O interface 806 may be split into two or more separate components, such as a north bridge and a south bridge, for example. Also, in some embodiments some or all of the functionality of I/O interface 806, such as an interface to system memory 804, may be incorporated directly into processor 802.

Network interface 810 may be configured to allow data to be exchanged between computer system 800 and other devices attached to a network 824 (e.g., carrier or agent devices) or between nodes of computer system 800. Network 824 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 810 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 812 may, in some embodiments, include one or more display terminals, keyboards, keypads, touchpads, scanning devices, voice or optical recognition devices, or any other devices suitable for entering or accessing data by one or more computer systems 800. Multiple input/output devices 812 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 810.

Those skilled in the art will appreciate that computer system 800 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
    a deformable lens defining an optical axis;
    a base structure; and
    a piezoelectric actuator, comprising:
        piezoelectric elements; and
        a frame coupled with the piezoelectric elements, the frame comprising:
            a first portion coupled with the base structure, the first portion comprising a rail surface for guiding motion in a direction parallel to the optical axis; and
            a second portion coupled with the deformable lens, the second portion comprising a contact surface, wherein the piezoelectric elements can be activated to produce relative elliptical motion, between the second portion and the first portion, that causes the contact surface to engage with the rail surface so as to drive motion of at least a portion of the deformable lens, in the direction parallel to the optical axis, relative to the base structure.

2. The system of claim 1, wherein at least one of the piezoelectric elements is attached to the base structure.

3. The system of claim 1, wherein the piezoelectric elements comprise one or more piezoelectric stacks.

4. The system of claim 1, wherein the piezoelectric elements comprise:
    a first piezoelectric stack having a first orientation; and
    a second piezoelectric stack having a second orientation different from the first orientation.

5. The system of claim 1, wherein:
    the piezoelectric elements comprise a first piezoelectric element and a second piezoelectric element; and
    the system further comprises:
        a controller to:
            determine one or more drive signals for controlling the piezoelectric actuator to drive motion of the deformable lens, wherein the one or more drive signals comprise at least one of:
                a first set of one or more drive signals for activating the first piezoelectric element; or
                a second set of one or more drive signals for activating the second piezoelectric element; and
            control the piezoelectric actuator to move the deformable lens according to the one or more drive signals.

6. The system of claim 5, wherein:
    the one or more drive signals comprise:
        the first set of one or more drive signals for activating the first piezoelectric element; and
        the second set of one or more drive signals for activating the second piezoelectric element; and
    the controller controls the piezoelectric actuator to move at least a portion of the deformable lens in a direction, wherein the direction is based at least in part on a phase difference between motion of the contact surface and motion of the rail surface.

7. The system of claim 1, wherein the piezoelectric elements comprise:
    a first pair of piezoelectric stacks oriented in a first direction; and
    a second pair of piezoelectric stacks oriented in a second direction orthogonal to the first direction.

8. The system of claim 1, further comprising:
a coupling structure attached to the deformable lens, wherein the coupling structure at least partially encircles the deformable lens; and
a plurality of actuators arranged along at least a portion of the coupling structure to enable, via actuation, multiple points of application of forces to move the deformable lens, wherein the plurality of actuators comprises the piezoelectric actuator.

9. The system of claim 1, wherein:
the first portion comprises a shaft having a central axis extending in the direction parallel to the optical axis;
the piezoelectric actuator further comprises:
a magnet to hold a last position of the second portion, relative to the shaft,
when the piezoelectric elements are not activated.

10. A piezoelectric actuator, comprising:
piezoelectric elements; and
a frame coupled with the piezoelectric elements, the frame comprising:
a first portion to couple with a base structure of an optics system, the first portion comprising a rail surface for guiding motion in a direction parallel to the optical axis; and
a second portion to couple with a deformable lens of the optics system, the second portion comprising a contact surface, wherein the piezoelectric elements can be activated to produce relative elliptical motion, between the second portion and the first portion, that causes the contact surface to engage with the rail surface so as to drive motion of at least a portion of the deformable lens, in the direction parallel to the optical axis, relative to the base structure.

11. The piezoelectric actuator of claim 10, wherein at least one of the piezoelectric elements is to attach to the base structure.

12. The piezoelectric actuator of claim 10, wherein the piezoelectric elements comprise one or more piezoelectric stacks.

13. The piezoelectric actuator of claim 10, wherein the piezoelectric elements comprise:
a first piezoelectric stack having a first orientation; and
a second piezoelectric stack having a second orientation different from the first orientation.

14. The piezoelectric actuator of claim 10, wherein the piezoelectric elements comprise:
a first pair of piezoelectric stacks oriented in a first direction; and
a second pair of piezoelectric stacks oriented in a second direction orthogonal to the first direction.

15. A device, comprising:
one or more processors;
memory storing program instructions executable by the one or more processors to control operations of an optics system;
the optics system, comprising:
a deformable lens defining an optical axis;
a base structure; and
a piezoelectric actuator, comprising:
piezoelectric elements; and
a frame coupled with the piezoelectric elements, the frame comprising:
a first portion coupled with the base structure, the first portion comprising a rail surface for guiding motion in a direction parallel to the optical axis; and
a second portion coupled with the deformable lens, the second portion comprising a contact surface, wherein the piezoelectric elements can be activated to produce relative elliptical motion, between the second portion and the first portion, that causes the contact surface to engage with the rail surface so as to drive motion of at least a portion of the deformable lens, in the direction parallel to the optical axis, relative to the base structure.

16. The device of claim 15, wherein at least one of the piezoelectric elements is attached to the base structure.

17. The device of claim 15, wherein the piezoelectric elements comprise:
a first piezoelectric stack having a first orientation; and
a second piezoelectric stack having a second orientation different from the first orientation.

18. The device of claim 15, wherein:
the piezoelectric elements comprise a first piezoelectric element and a second piezoelectric element; and
the device comprises a controller to:
determine one or more drive signals for controlling the piezoelectric actuator to drive motion of the deformable lens, wherein the one or more drive signals comprise at least one of:
a first set of one or more drive signals for activating the first piezoelectric element; or
a second set of one or more drive signals for activating the second piezoelectric element; and
control the piezoelectric actuator to move the deformable lens according to the one or more drive signals.

19. The device claim 18, wherein:
the one or more drive signals comprise:
the first set of one or more drive signals for activating the first piezoelectric element; and
the second set of one or more drive signals for activating the second piezoelectric element; and
the controller controls the piezoelectric actuator to move at least a portion of the deformable lens in a direction, wherein the direction is based at least in part on a phase difference between motion of the contact surface and motion of the rail surface.

20. The device of claim 15, wherein the optics system further comprises:
a coupling structure attached to the deformable lens, wherein the coupling structure at least partially encircles the deformable lens; and
a plurality of actuators arranged along at least a portion of the coupling structure to enable, via actuation, multiple points of application of forces to move the deformable lens, wherein the plurality of actuators comprises the piezoelectric actuator.

* * * * *